(12) United States Patent
Gabriel et al.

(10) Patent No.: US 10,209,838 B2
(45) Date of Patent: Feb. 19, 2019

(54) OPERATING PANEL FOR A HOUSEHOLD APPLIANCE WITH AT LEAST ONE USER INTERFACE, HOUSEHOLD APPLIANCE, AND METHOD FOR PRODUCING THE OPERATING PANEL WITH USER INTERFACE

(71) Applicant: SCHOTT AG, Mainz (DE)

(72) Inventors: Annelie Gabriel, Klein-Winternheim (DE); Franziska Back, Schweinfurth (DE); Franziska Riethmüller, Frankfurt am Main (DE); Thomas Zenker, Nieder-Olm (DE)

(73) Assignee: SCHOTT AG, Mainz (DE)

( * ) Notice: Subject to any disclaimer, the term of this patent is extended or adjusted under 35 U.S.C. 154(b) by 84 days.

(21) Appl. No.: 15/222,706

(22) Filed: Jul. 28, 2016

(65) Prior Publication Data

US 2017/0031480 A1   Feb. 2, 2017

(30) Foreign Application Priority Data

Jul. 28, 2015 (DE) .................. 10 2015 112 317
Jul. 18, 2016 (DE) .................. 10 2016 113 162

(51) Int. Cl.
*G06F 3/044* (2006.01)
*F24C 7/08* (2006.01)
(Continued)

(52) U.S. Cl.
CPC .............. *G06F 3/044* (2013.01); *F24C 7/086* (2013.01); *G06F 3/0416* (2013.01); *A47L 15/4293* (2013.01); *D06F 39/005* (2013.01)

(58) Field of Classification Search
CPC ........ G06F 3/044; G06F 3/0416; F24C 7/086; A47L 15/4293; D06F 39/005
See application file for complete search history.

(56) References Cited

U.S. PATENT DOCUMENTS 5,113,041 A   5/1992   Blonder
5,463,388 A   10/1995  Bole
(Continued)

FOREIGN PATENT DOCUMENTS

DE   102004026836   12/2005
DE   202006010488   11/2006
(Continued)

OTHER PUBLICATIONS

AN64846 "Getting Started With CapSense", Cypress Semiconductor, San Jose, CA, 2016, 132 pages.

*Primary Examiner* — Lisa L Landis
(74) *Attorney, Agent, or Firm* — Ohlandt, Greeley, Ruggiero & Perle, L.L.P.

(57) ABSTRACT

An operating panel for a household appliance is provided with at least one user interface. The operating panel includes a planar support with an outer support surface facing an external region; a planar glass or glass-ceramic substrate with an outer substrate surface facing the external region and an opposite-lying inner substrate surface facing away from the external region and facing the outer support surface; a display element affixed to the support for luminous indication of information, which is preferably disposed on the outer support surface; and a sensor arrangement having at least two sensors, each of which comprises at least one electrode and is disposed on the inner substrate surface, for interaction with a user located in the external region.

22 Claims, 13 Drawing Sheets

(51) Int. Cl.
*G06F 3/041* (2006.01)
*A47L 15/42* (2006.01)
*D06F 39/00* (2006.01)

(56) References Cited

U.S. PATENT DOCUMENTS

| | | | |
|---|---|---|---|
| 7,821,502 | B2 | 10/2010 | Hristov |
| 8,319,747 | B2 | 11/2012 | Hotelling |
| 8,754,662 | B1 * | 6/2014 | Weng ................. G01R 27/2605 |
| | | | 324/686 |
| 9,081,453 | B2 | 7/2015 | Bulea |
| 2004/0125087 | A1 | 7/2004 | Taylor |
| 2008/0312857 | A1 | 12/2008 | Sequine |
| 2009/0033343 | A1 * | 2/2009 | Reynolds ............ H03K 17/955 |
| | | | 324/688 |
| 2010/0134422 | A1 | 6/2010 | Borras |
| 2011/0022351 | A1 | 1/2011 | Philipp |
| 2011/0248962 | A1 | 10/2011 | Poupyrev et al. |
| 2012/0227259 | A1 * | 9/2012 | Badaye ................... G06F 3/044 |
| | | | 29/846 |
| 2012/0327016 | A1 | 12/2012 | Hristov |
| 2013/0100041 | A1 | 4/2013 | Golovchenko |
| 2013/0147751 | A1 | 6/2013 | Alaman Aguilar et al. |
| 2014/0202840 | A1 | 7/2014 | Fix |
| 2014/0327848 | A1 | 11/2014 | Fix |
| 2015/0116254 | A1 | 4/2015 | Solven et al. |
| 2015/0261348 | A1 | 9/2015 | Jang |
| 2016/0120028 | A1 * | 4/2016 | Bach ..................... H05K 1/0274 |
| | | | 345/174 |
| 2016/0154517 | A1 | 6/2016 | Ullmann |
| 2016/0170518 | A1 * | 6/2016 | Donnelly .............. G06F 3/0412 |
| | | | 345/174 |
| 2016/0188034 | A1 | 6/2016 | Bayramoglu |
| 2016/0334919 | A1 * | 11/2016 | Zhu ........................ G06F 3/044 |

FOREIGN PATENT DOCUMENTS

| | | |
|---|---|---|
| DE | 102005027199 | 12/2006 |
| DE | 102005041114 | 3/2007 |
| DE | 112008001245 | 3/2010 |
| DE | 102008050215 | 4/2010 |
| DE | 102010030315 | 12/2011 |
| DE | 102011108153 | 1/2013 |
| DE | 102011122110 | 6/2013 |
| DE | 102013104644 | 11/2014 |
| DE | 102014219348 | 3/2016 |
| EP | 2472186 | 7/2012 |
| WO | 2012032432 | 3/2012 |

* cited by examiner

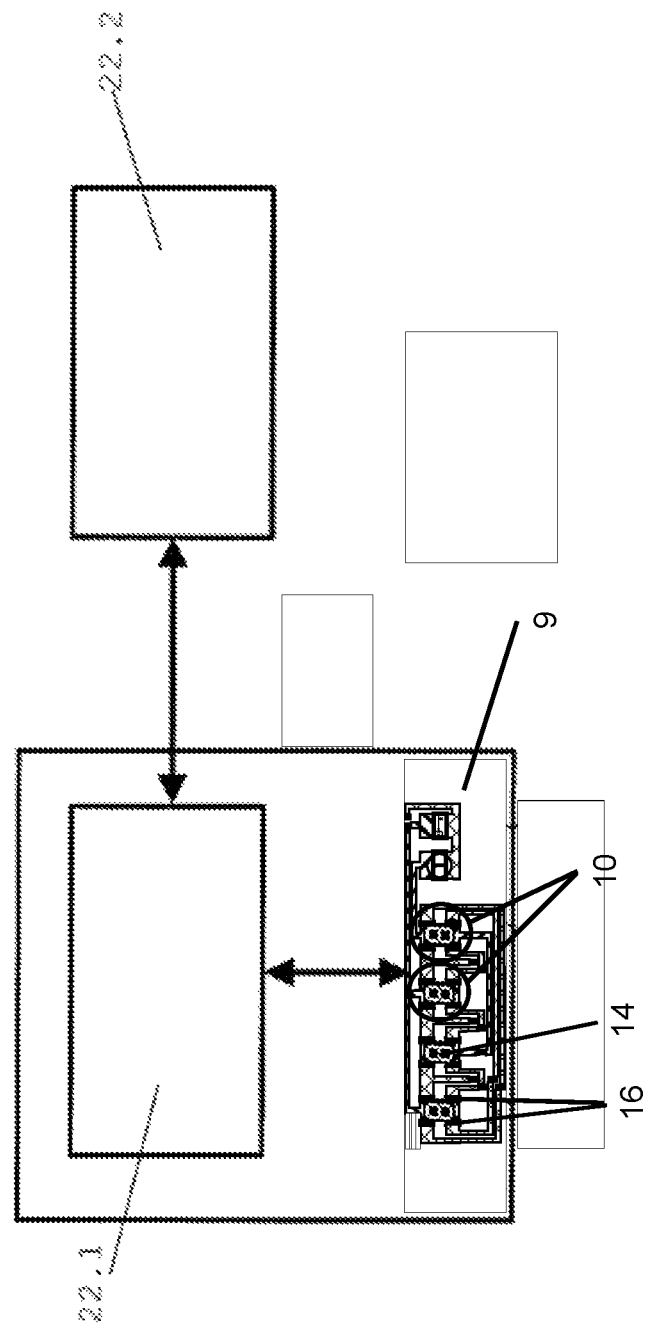

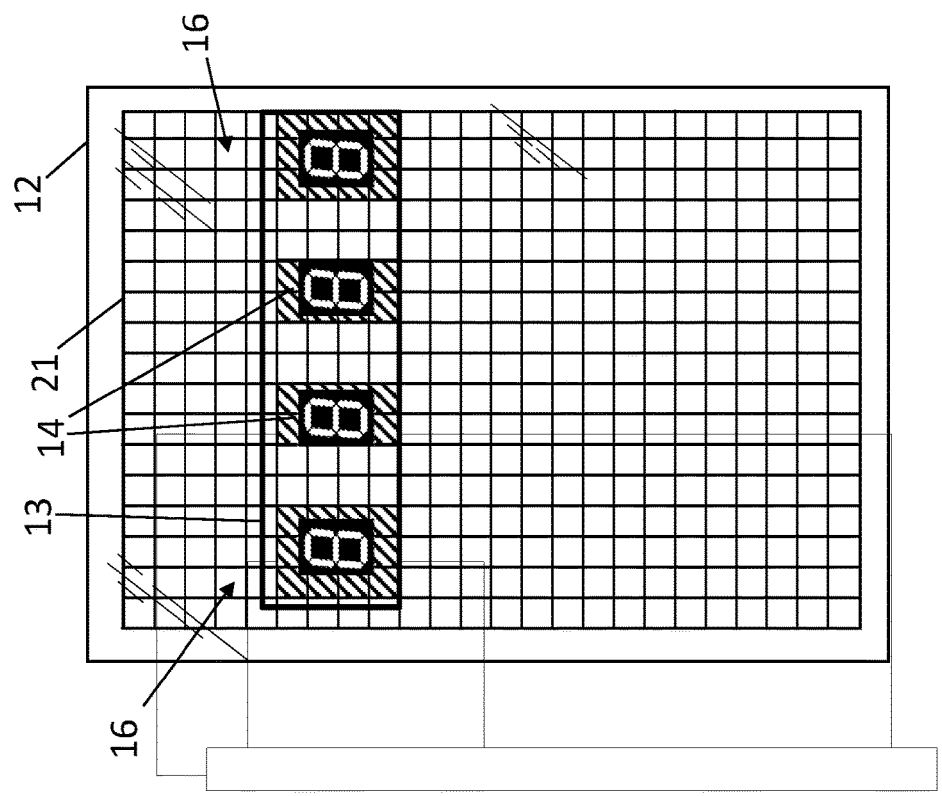
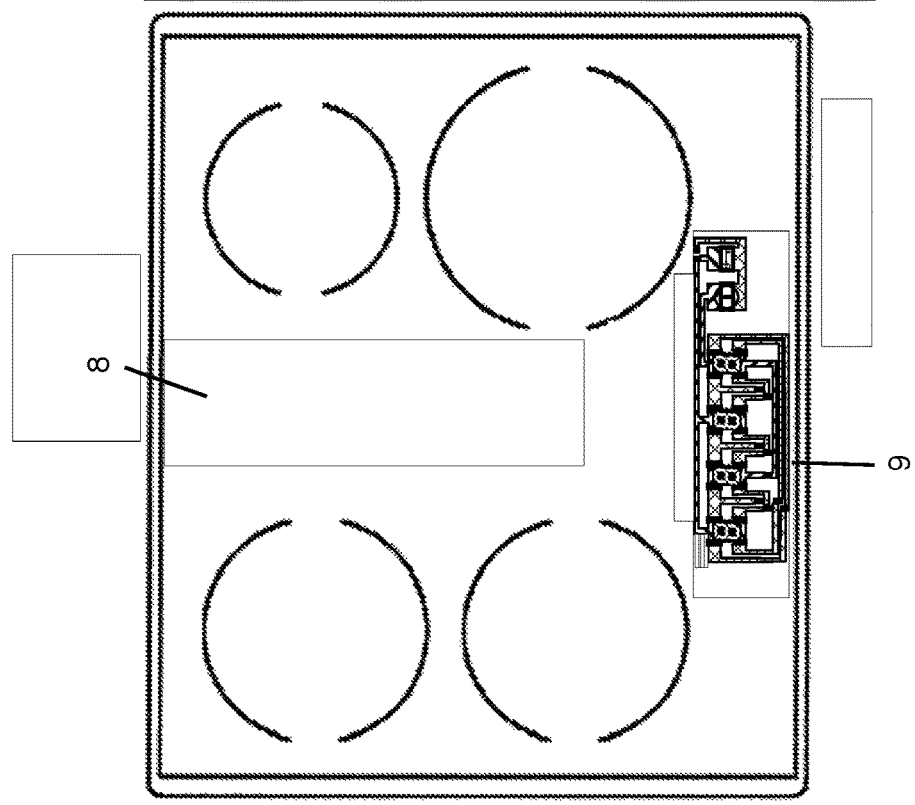
Fig. 8
Fig. 6b

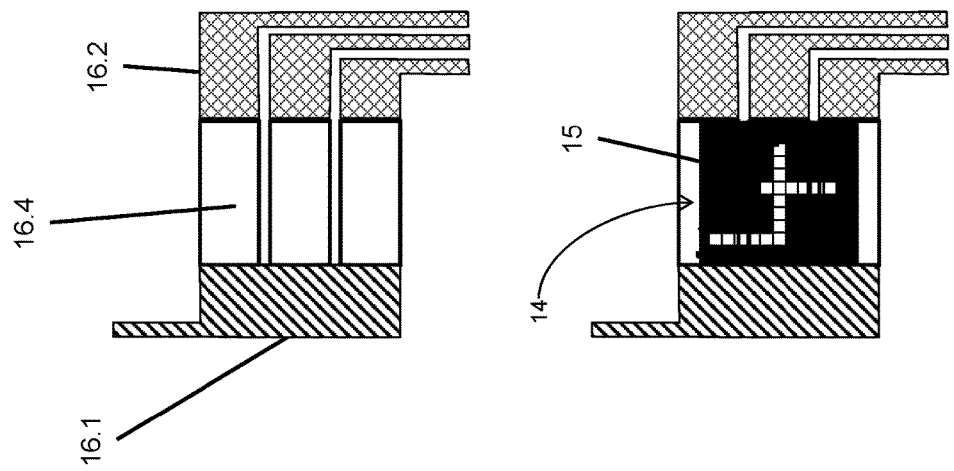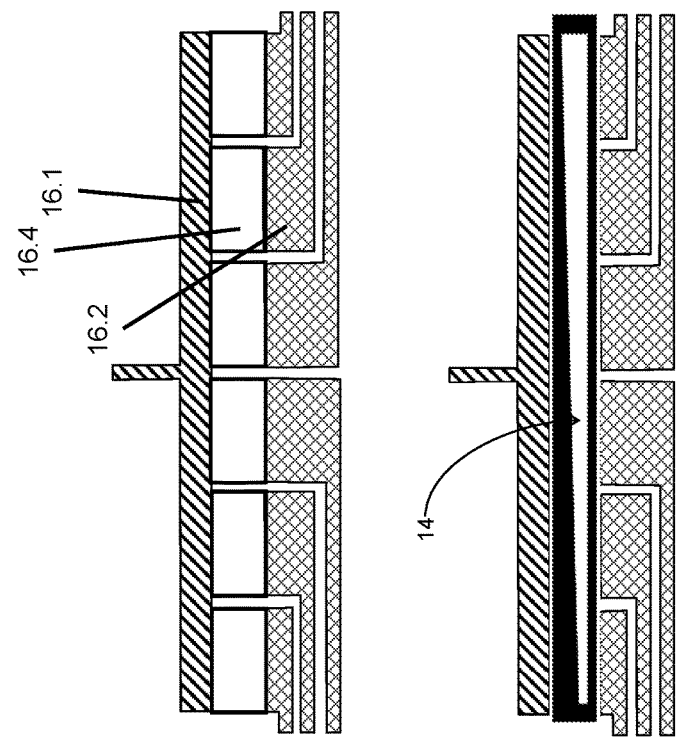

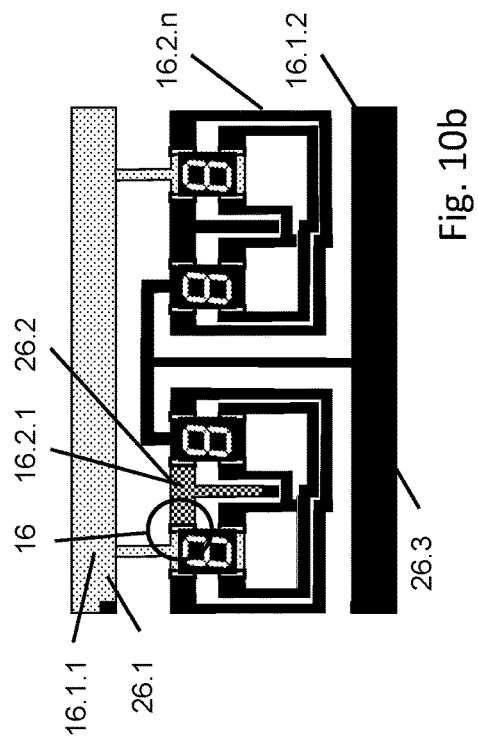
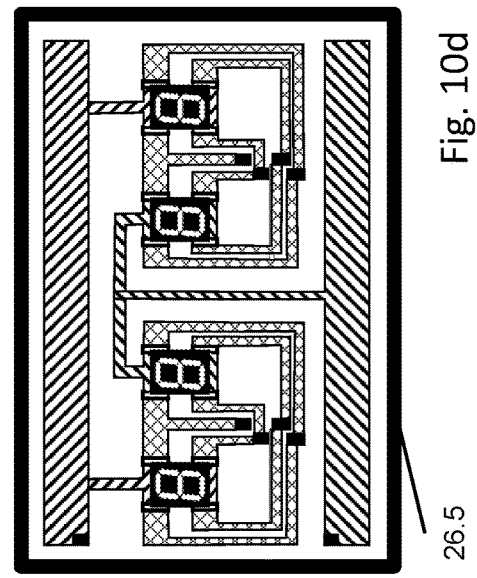
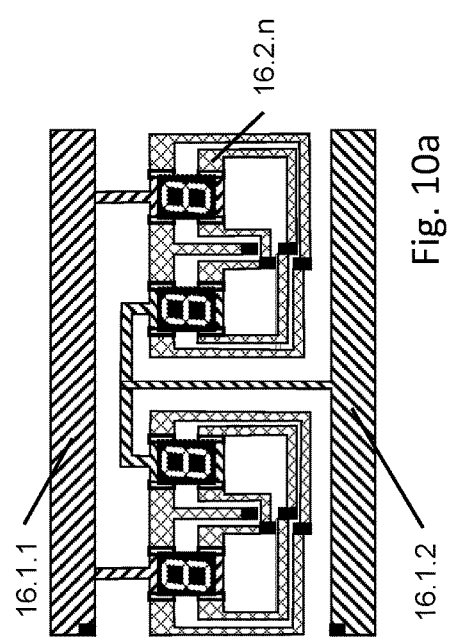
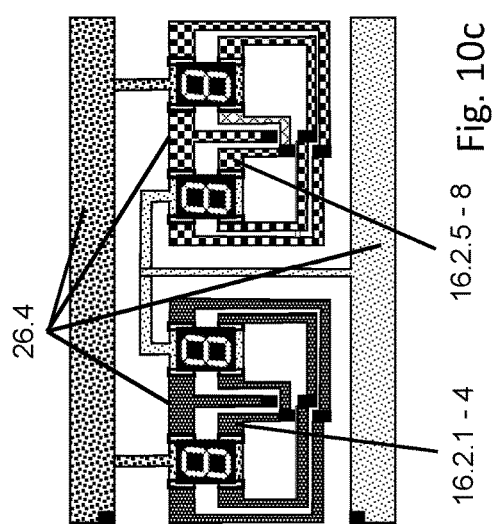

OPERATING PANEL FOR A HOUSEHOLD APPLIANCE WITH AT LEAST ONE USER INTERFACE, HOUSEHOLD APPLIANCE, AND METHOD FOR PRODUCING THE OPERATING PANEL WITH USER INTERFACE

CROSS REFERENCE TO RELATED APPLICATIONS

This application claims benefit under 35 U.S.C. § 119(a) of German Application No. 10 2015 112 317.7 filed Jul. 28, 2015, the entire contents of which are incorporated herein by reference.

BACKGROUND OF THE INVENTION

1. Field of the Invention

The invention relates to an operating panel for a household appliance, preferably a cooking apparatus. Further, the invention relates to a method for producing the operating panel with user interface.

2. Description of Related Art

The contact screen or touch screen enjoys great popularity for operating electronic devices, which is not lastly related to the ease with which control of the device is made possible by swiping gestures and similar operating patterns. In the field of household appliances, in particular, cooking apparatuses, it has been difficult up to now to integrate a touch screen. On the one hand, the reason for this is associated with the fact that in a cooking apparatus, the horizontal operator surfaces are subjected to high temperatures and wetting liquids. On the other hand, the touch screen drives up costs for the household appliance.

A cooktop appliance having a glass-ceramic unit that forms a cooktop plate is known from EP 2472186 A2. The cooktop appliance is equipped with an operating unit that comprises a plurality of touch-sensitive sensor fields with touch-sensitive, capacitive sensor elements. In this way, a sliding contacting movement of an operator, which is essentially conducted parallel to a lateral direction can be detected via the sensor fields. Further, known from DE 102005027199 A1 is a glass-ceramic cooktop, to which is assigned a touch-sensitive sensor field for detecting a contact position, for example, of an operator's finger. A movement parameter that creates a control signal can be determined from a temporal sequence of detected contact or touch positions. Only movements in a direction determined in advance can be detected in these solutions; the detection of a movement of the operator guided in any arbitrary direction is not provided.

Known from DE 102010030315 A1 is a touch-sensitive input unit for a household appliance, for example, a laundry treatment machine, a dishwasher, or a cooking appliance. The input unit has an electrically insulating covering sheet of glass or glass ceramic or is in the form of a Plexiglas panel. To operate the input unit, a user's finger touches the outside of the Plexiglas panel or is brought close to it. However, this publication does not provide a detection of a user's movement that is conducted, in particular, in any arbitrary direction.

A two-dimensional, touch-sensitive, capacitive position sensor is known from U.S. Pat. No. 7,821,502 B2, wherein the position of a finger or stylus on the sensor is detected. The region of detection of the position sensor is transparent and can be disposed in front of a display screen without adversely affecting the presentation of the display screen. This arrangement, however, is comparatively complex.

A double-electrode assembly comprising a pcap sensor is known from US 2008312857.

In addition, a self-capacitance arrangement with a single-electrode sensor and a surrounding electrode surface as a shield electrode is known from the document "AN64846 Getting Started with CapSense®" of the company Cypress Semiconductor; and grounded, surrounding electrode surfaces are known from WO 12032432 and DE 102014219348.

SUMMARY

The object of the invention is to provide a cost-effective and at the same time flexible user interface, which makes possible a recognition of swiping gestures, for example, swiping movements on the user surface or gestures in the near field above the operator surface, or an improved resistance to interference relating to surface contaminations or electromagnetic interference signals, and preferably is suitable for a household appliance, for example, a cooking apparatus.

This object is achieved by the embodiments and enhancements disclosed herein.

One aspect of the invention relates to an operating panel with user interfaces for a household appliance, preferably a cooking apparatus. The operating panel with at least one user interface or preferably two, three, or four user interfaces for a household appliance, preferably a cooking apparatus, comprises: a preferably planar support with an outer support surface facing an external region; a preferably planar substrate, preferably at least partially made of glass or glass-ceramic material, optionally made of plastics or laminates, composed of an outer substrate surface facing the external region, and an opposite-lying inner substrate surface facing away from the external region and facing the outer support surface; a display element for luminous presentation of information, which is preferably disposed on the outer support surface; and a sensor arrangement having at least two sensors, each of which comprises at least one electrode and is disposed on the inner substrate surface, for interaction with a user located in the external region, wherein sensors having one electrode can also be disposed on at least one display element.

Optionally, a user interface or each of the user interfaces may comprise at least one display element, or preferably two, three or four display elements, as well as sensors, each having at least two electrodes.

The display element can also be disposed on the inner substrate surface.

In order to produce electrically conducting connections between contact points on the support and the electrodes, or, in general, to electrically make contact between the conductor structures of substrate and support, corresponding suitable contact elements are provided. These can be configured in various ways, roughly in the form of spring contacts, electrically conducting flexible molded parts made of plastic, electrically conducting adhesive bonds, or also elements in the form of wire connections.

The substrate is transparent to light emitted by the display element, at least in the region of the display element, such that the information represented on the display element is recognizable to a user through the substrate.

The substrate is preferably planar. According to another embodiment, the substrate can be bent, in particular, even in the operating region.

Another aspect of the invention relates to an operating panel for a household appliance, preferably a cooking apparatus. The operating panel comprises at least one of the described user interfaces, preferably a plurality of user interfaces, as well as a control for the one or more user interfaces. The control can be constructed on a circuit board as an electronic circuit or in an integrated electronic chip and can be disposed spatially separate from the user interface.

Another aspect of the invention relates to a household appliance, preferably a cooking apparatus, comprising the above-described operating panel. The operating panel can preferably be disposed in a cold region of a cooking surface of the cooking apparatus, away from the heating zones.

The individual user interfaces in the operating panel can be arranged in any arbitrary manner, and are only limited by the space available outside the heating zones in a cooking surface. Previously, conventional touch display interfaces in known configurations, which, as a single user interface having a display unit and a plurality of sensors, and imaging all operating aspects of the cooking apparatus (except, optionally, the power switch), are usually limited by their space requirement to a rectangular form. The user interface arrangement of this invention, in contrast, can form any arbitrary polygonal shape and is only limited by the named space available and the dimensions of the cooking apparatus.

The outer substrate surface, which is facing the external region and the user, and which the user can touch in order to control the household appliance, represents an operator surface.

The support can be designed, on the one hand, for supporting or holding the display element, and, on the other hand, as a circuit board for electronic components that belong, for example, to a control for the user interface or for the household appliance.

The electrodes are thus disposed in relation to the display element such that signals of spaced-apart, preferably adjacent sensors can be detected when an operator's finger touches or passes over the luminous region of the display element. In this way, advantageously, a control of the household appliance is made possible by means of the operating panel via a swiping gesture.

The user interface can be operated by means of touching the operator surface or by a swiping gesture in the proximity or near field of the operator surface, for example, at a distance of ≤50 mm, ≤30 mm, or ≤10 mm. In addition, the signal recognition can be adjusted so that an approach in the near field of a touch on the operator surface can be distinguished. In this way, for example, with the approach, the display(s) of one or a group of user interfaces can light up and/or change color and/or the information display can be changed, in order to intuitively support a user's intent. The operating process itself then occurs upon contact.

In addition, electrodes from all of the user interfaces, in particular, in the edge region of the user interface arrangement can be evaluated by the control, so that via the temporal sequence of electrode signals, a user's approach or a gesture operation will be recognized in the far field, the latter preferably limited to a distance of <300 mm, more preferably <200 mm, or most preferably <100 mm, or operating gestures will be recognized over all or over parts of the entire user interface arrangement. These gestures may serve, in particular, for operating high-level functions, such as a visually animated waking up of the device when a user approaches, a rapid disconnection, a selection of a cooking zone, or also a turning on of an exhaust hood connected to the cooking apparatus. For improved recognition of said far-field gestures, individual electrodes can be designed with a large surface, and these electrodes form a stand-alone sensor or part of a sensor of at least of one user interface.

For near-field and/or far-field recognition, individual electrodes can also be interconnected in a query sequence, so that they present a larger, coherent electrode surface.

In a first, particularly preferred embodiment variant, a sensor (also called a "double-electrode sensor") in the following) can comprise a first electrode and a second electrode laterally distanced from the first electrode by a gap. A preferred arrangement is that at least 2 sensors or up to N sensors are disposed for each display element. A sensor of the user interface therefore comprises a first electrode and a second electrode laterally distanced from the first electrode by a gap. In this case, it is not necessary to connect all electrodes separately. Rather, preferably, several, and more preferably, each of the sensors of a user interface could have the same first electrode.

The first electrode can be disposed in an edge region of the display element, or over the entire surface above or centrally above the surface of the display element. The second electrode can be disposed in the edge region or outside of the display element. All double-electrode sensors of a double-electrode arrangement (sensor arrangement with double-electrode sensors) can thus have a common electrode, which coincides with the first electrode. The double-electrode arrangement thus has the structure of a 1:N matrix at a display element, wherein the first electrode stands opposite a plurality of second electrodes, and the first electrode is separated by a gap from the second electrodes. This means that the first electrode can be separated by a gap from one second electrode, or from several second electrodes, or from each of the second electrodes.

Positional data, such as "outside the display element", "edge region of the display element" or "laterally" are based on a view from the top or a plan view, wherein "top" is understood from a perspective in the external region, above the outer substrate surface, looking approximately perpendicularly onto the outer substrate surface.

A display element is preferably a component with a housing, wherein at least one part of the top side of the housing forms the luminous region of the display element, in which information can be presented in luminous surfaces. The luminous surfaces of a luminous region may present divided, segmented, or masked luminous symbols.

The first electrode of a double-electrode sensor can be overlapped with the display element, preferably the luminous region of a display element, in an overlapping region, wherein the overlapping region is viewed from the top. The overlapping region can be zero or greater than zero, and, in particular, can show less than 80%, 50%, 30% or 10% of the surface of the display element, preferably of the luminous region of the display element. With an overlapping region of 0%, the first electrode is disposed outside the display element, and with an overlapping region of 100%, the first electrode covers the entire surface of the display element.

In the case of an overlapping between the first electrode and the display element, the first electrode can be transparent or can have an opening, so that the information shown on the display element is visible through the electrode or the opening to a user in the external region.

The user interface is a combined input and output device. A sensor can interact with the display element to the effect that the display element displays an interaction of the user with the sensor; for this purpose, the sensor can be connected electrically to the display element. The sensor and the display element can also be connected electrically to a control for the user interface or the household appliance.

The display element of the user interface makes possible an optical output to the user. The information can be provided on the display element in the form of an analog or digital signal from a region external to the user interface, preferably a control of the user interface. The double-electrode arrangement also makes possible an input of data or information; when the user touches the substrate (or operates in the near field directly above the substrate) in a region of a double-electrode sensor, in particular, in a region of the gap between the electrodes of the double-electrode sensor, the double-electrode sensor can generate a signal, which the user interface provides, preferably in the form of an analog or digital signal, to a control of the user interface or of the household appliance.

It is known from graph theory that completely interconnected 2:N-matrix structures can still be represented without crossing. This corresponds to complete, bipartite graphs $K_{2,N}$, with any arbitrary N, as will be explained in more detail later in the embodiment examples. If these graphs are still planar, this means precisely that the structure of the electrodes, including their leads and contact surfaces for the control unit, are still crossing-free in one plane, that is, can be shown in one layer of conductive flat surface elements. This plane can be a bent or unbent surface. Complete, bipartite graphs $K_{3,N}$, with N>2, are no longer planar.

Of course, graphs $K_{M,N}$, M,N>2 can also be represented without crossing, if they are not complete. In graph theory, complete means that each node N is joined to each node M by an edge. In this case, the first electrodes correspond to a first node set, and the second electrodes correspond to a second node set of the bipartite graph. The gaps between the electrodes of the first and second type correspond to the edges of the graphs. In this case, without crossing also means that leads or conductive connections must not be conducted through a sensor gap, so that the cross-insensitivity (immunity to interference) is improved between individual sensors.

In an enhancement of the invention, it is advantageously provided to realize this planar $K_{M,N}$, preferably $K_{2,N}$ structure, in the electrode arrangement. For this purpose, preferably 2 display elements (two user interfaces), each having N double-electrode sensors are grouped in such a way that i) a different first electrode is assigned in each case to the N sensors of the two display elements, and ii) the N second electrodes are each assigned in common to both display elements, so that iii) the N second electrodes each make up a sensor with both first electrodes, separated by a gap, and form a 2:N structure.

The double-electrode arrangement made up of 2N sensors having the structure of a 2:N matrix, N≥2, is subsequently compared to a known sensor arrangement having the structure of a 2N×1:1 matrix; in a 2N×1:1 matrix, 2N sensors do not have a common electrode.

Functionally, thus with respect to the detection of a user's operating pattern, for example, a position of one finger or two fingers, a one-finger swiping movement, or a two-finger zoom movement (with three sensors), both structures are approximately equivalent. The structure of a display element of a 1:N matrix, N≥2, of the double-electrode arrangement, based on the spatially separate arrangement of the second electrodes underneath one another and opposite the first electrode, is able to recognize, detect or resolve different positions of a finger or several fingers relative to the operator surface, or a sliding, contacting movement, or a swiping gesture of a user above the operator surface, which is carried out in any arbitrary direction.

With increasing number N of second electrodes, the 2D resolution of the double-electrode arrangement improves.

Structurally, thus with respect to the construction and complexity of the structures, the 2:N structure of the double-electrode arrangement is considerably less complex than the known arrangement of 2N×1:1 sensors. The number of electrode leads for the 2N sensors with 1:1 structure is 4N and more than double the number of electrode leads in double-electrode sensors with 2:N structure, the latter amounting to N+2.

Consequently, the electrical properties of a 2:N double-electrode arrangement, when compared to a known 2N×1:1 arrangement, for example, with respect to i) decoupling of the signals of different electrode pairs and their leads; ii) immunity to interference, and iii) signal-to-noise ratio, are considerably better. Also, the cost of the double-electrode arrangement is considerably less, since, based on the simpler structure, a smaller expenditure for design and maintenance, as well as a smaller expenditure for materials are incurred.

In the present document, the formulations "x:N matrix" and "x:N structure", x=1, 2, 3, . . . will be used equivalently. Particular advantages generally result if at least two first electrodes are interconnected in the case of a plurality of user interfaces of an operating panel.

Preferably, the interconnection is made in pairs. Then, in order to achieve a particularly simple connection of the electrodes, it is provided that the electrodes of the sensors are disposed in a sensor matrix, which is formed as a bipartite graph, wherein the bipartite graph preferably for one user interface is a 1:N graph and for paired user interfaces is a 2:N graph, and the second electrodes (16.2) form N second nodes of a second node set, and wherein the first electrodes form two nodes of a first node set, and wherein the edges of the graph are formed by the gaps between the first and second electrodes.

A user interface, or the interconnection of the electrodes of this user interface can also be designed as a 2:N/2 graph, so that paired user interfaces again form a 2:N graph. The N second electrodes can also be assigned in pairs to different user interfaces arbitrarily, so that a 2:N graph is formed for all of the user interfaces. The formation of an individual user interface as a 2:N/2 graph also makes possible a formation of a complete, bipartite 2:N graph $K_{2,N}$ with an uneven number of user interfaces.

In a second embodiment variant, one sensor ("single-electrode sensor" in the following) can comprise one single electrode, which is disposed in an edge region of the display element. The word "one" indicates any arbitrary sensor present in the user interface and thus to any one of the sensors. In each case, a single-electrode sensor can be formed as a capacitive touch sensor and can comprise a single electrode that overlaps with the display element in an overlapping region. The overlapping region is generally greater than zero.

The electrode of a single-electrode arrangement can be surrounded by a second number of electrodes that are designed as screen and/or shield electrodes. Screen electrodes are operated at a fixed potential, preferably a ground potential, in order to screen against electromagnetic interferences. Shield electrodes are preferably operated with the same sensor alternating potential, which represents a harmonic or pulsed alternating signal or a sequence of signal pulses. Between the single-electrode sensor and the shield electrode, a potential difference is not formed, and consequently no parasitic capacitive impedances are formed, whereby the signal-to-noise ratio of a touch signal on the single-electrode sensor by a user is improved.

The single-electrode sensors of a single-electrode arrangement (sensor arrangement with single-electrode sensors) are disposed at a distance laterally to one another, whereby a connection line between the single-electrode sensors generally intersects with the display element, in order to make possible a swiping gesture operation over the display element. The intermediate spaces of the single-electrode arrangement can be filled at least partially by screen and/or shield electrodes.

In a planar matrix interconnection x:n, preferably 2:n, an unambiguous assignment of a touch to precisely one sensor can be carried out with unambiguous assignment of an electrodes pair a:b to precisely one sensor$_{ab}$ through the following "self-capacitance" actuation methods individually or in combination.

A planar matrix interconnection having x first electrodes 16.1.x and n second electrodes 16.2.n, in which the first and second electrodes are disposed at a distance to one another in a type of matrix, is operated as a single-electrode sensor matrix, wherein first electrodes and second electrodes are actuated in alternating manner as a single-electrode sensor (open capacitor), wherein the other electrode set in each case, thus the first electrodes when a second electrode is activated and vise versa, is preferably actuated as an interconnected screen electrode, more preferably as an interconnected shield electrode, or wherein electrodes of one electrode set are actuated as a single-electrode sensor (open capacitor) and electrodes of the other electrode set in each case are actuated z-times in alternating manner as a y-times interconnected shield electrode, or y-times interconnected as a shield electrode and (x-y)-times interconnected as a screen electrode, preferably at ground potential, or wherein electrodes of one electrode set are actuated as a single-electrode sensor (open capacitor) for touch and near field recognition and electrodes of the other electrode set in each case are preferably actuated as interconnected shield electrodes and/or screen electrodes, and in alternating manner y-times interconnected electrodes are actuated z-times in alternating manner as a proximity sensor (open capacitor) for far-field recognition, wherein in this case, the other (x-y) first electrodes and/or second electrodes can preferably be actuated as a shield electrode and/or screen electrodes.

In comparison to a double-electrode design, the single-electrode design has the advantage that its sensor effect is provided separately by each single-electrode sensor or each single electrode and a double-electrode arrangement with a narrow gap is not necessary (the sensor effect here depends on the capacitive gap between the double electrodes). Also, the single-electrode sensors require only one lead per sensor in comparison to the two leads per double-electrode sensor. The latter, however, is only an apparent advantage, since the electrodes can be interconnected in a matrix structure only in the double-electrode design, whereby the total number of leads again can be reduced advantageously to fewer than in a single-electrode arrangement.

A double-electrode arrangement or a single-electrode arrangement with at least one user interface with a display element has a number M of sensors, but at least two sensors, disposed on the substrate. The necessary number M is aligned with the type of swiping gesture, thus movement patterns that should be detectable. If, for example, each of 2 L display elements (user interfaces) has M sensors, then for a single-electrode design, there results 2ML sensors, 2ML electrodes, and 2ML leads. Likewise, for a double-electrode design, there results 2ML sensors, 2 first electrodes, ML second electrodes and 2+ML leads, fewer than in the single-electrode arrangement.

A described bipartite M:N sensor matrix, preferably in a 2:N interconnection, in which one electrode pair can be assigned very precisely to each sensor, can be evaluated via changes in self-impedances (single-electrode sensor), of a first electrode or of a second electrode or via counter-impedances (double-electrode sensor). For this purpose, different connections of the electrodes to different signal buses are necessary, in the case of pcap operation to transmitting signals and receiving channels, as well as in the case of single-electrode operation to transmitting signals for shield electrodes, to a signal bus for the evaluation of self-impedances for single electrodes or monitoring electrodes, as well as a bus line with fixed potential, in particular, a ground potential for screen electrodes. Such functional electrodes are usually constructed in two or more layers of conductive layer structures, for example, single-electrode sensors are surrounded by shield electrodes or screen electrodes, and the leads to the single electrodes are placed in a second layer underneath the shield or screen layer.

In a planar interconnection, preferably a 2:N matrix, preferably each of the sensor electrodes is connected preferably to at least one of four signal buses in an alternating and temporally intermittent manner: a transmitting bus Tx, a receiving bus Rx, a signal bus Z for evaluation of self-impedances, and a bus P with fixed potential, preferably ground potential. The signal bus can be designed physically as four separate signal bus lines or as fewer than four physically separate lines, wherein individual signal bus lines can be actuated intermittently with different bus signals by the control.

Temporally intermittent individual sensor electrodes of one sensor can be connected to the sensor bus signals Tx, Rx, or Z, while at the time point when this one sensor is queried, other surrounding electrodes can be connected to bus signals Tx or P for shielding or screening. In addition, groups of sensor electrodes can be connected together for a near-field or far-field recognition. The functional electrodes can therefore be shown in a planar layer structure, and thus without crossing.

The enveloping user interface arrangement of this invention can form any arbitrary polygon. In the polygon, the interconnected sensor electrodes preferably form two, and more preferably, precisely one, planar, coherent matrix interconnection M:N, with M≥1, N≥2.

Preferably, one sensor is formed as a capacitively acting sensor element. Basically, however, the use of a resistive, inductive, piezo-electrically or thermo-electrically acting sensor element or a realization by means of SAW or IR, or in case of using a plurality of sensors, a combination of sensor elements of the listed modes of operation, is also possible.

Another aspect of the invention relates to a method for producing the operating panel with user interface according to the invention. The method for producing an operating panel comprises producing a structured, electrically conductive coating on a preferably planar substrate (12), preferably a glass or glass-ceramic plate or panel, which is transparent, at least in sections, wherein the coating forms electrodes for at least two sensors, each sensor comprising at least one electrode, as well as optionally their leads and optionally their contact sites; fastening at least one display element onto a support, preferably onto an outer support surface of the support, this surface facing an external region; affixing the support to the substrate on the side of the substrate on which the electrodes are disposed, whereby contact elements of the support connect the electrodes to the support.

The method can comprise the steps of: applying a structured, electrically conductive, transparent coating or applying an electrically conductive, structured coating or entire-surface coating and subsequent structuring (e.g., laser), or applying a polymer film or a glass support with electrically conductive structures to a transparent substrate, preferably a glass or glass-ceramic plate or panel, by means of at least one method comprising: printing, spraying, roll-coating, rotation coating, slot coating, physical or chemical vapor deposition, adhesive bonding or laminating or bonding, optionally applying an opaque, conductive, structured coating according to a method such as indicated under a) applying additional decorative layers (e.g., opaque coloring, semitransparent coloring) and/or protective layers (e.g., sealing layers, optical balancing layers, barrier layer) as an entire surface coating or structured or recessed, applying or arranging at least one display element in the control circuit on an outer support surface of a support, this surface facing an external region; fitting the support with the substrate on the side of the substrate on which the electrodes are disposed, wherein the contact elements connect the electrode leads on the substrate to the control circuit on the support.

The sequence of the steps a), b) and c) is not fixed in this case. The display element can be applied by known mounting methods for electronic circuit boards or adhesively or by means of adhesive bonding, laminating, bonding, or by a plug or pin connection on the support.

The support can be fitted adhesively by adhesive bonding, laminating, bonding, and/or mechanically by pressing directly, or by snapping in, screwing to, or adhesive fitting indirectly to a holding frame fitted on substrate 12 on the bottom side 12.2 of the substrate 12.

The application of the coating onto the substrate by means of a method of: printing, spraying, roll-coating, rotation coating, slot coating, may include a drying step or a hardening/curing of the coating by means of UV irradiation or heat treatment, preferably in a temperature range of 150-500° C., during a time of 10 min to 3 hours.

The execution of the method in steps for which known and proven processes are used each time makes possible a problem-free and cost-effective production of the user interface.

According to one embodiment, the gap between the first electrode and one of the second electrodes can have an approximately linear or meandering course. Meandering can be zigzag, wave-shaped, or helical. The meandering course brings about an increase in the capacitance present between the electrodes. Consequently, the signal-to-noise ratio is improved with increasing constriction and length of the gap. A constricted gap width can amount to 5-200 μm.

It may also be advantageous to design the gap width on the order of magnitude of the substrate thickness, in order to generate a stronger field passage through the substrate on the operator surface, preferably with a gap width d referred to the substrate thickness D of $\frac{1}{4}D<d<2D$, or of $\frac{1}{2}D<d<D$. The signal-to-noise ratio can be further improved thereby for acting on the operator surface or in the near field over the operator surface.

Upon touching a sensor zone on or in the near field above the operator surface, the counter-capacitance and thus a basic signal between the double electrodes of the sensor is attenuated, since a portion of the signal current above the grounded finger or a grounded contact object is grounded. (The counter-capacitance of the sensor gap is reduced upon contact).

In another embodiment with single-electrode sensors, the self-capacitance and thus the signal current increases upon contact. The change in the signal current and the shift in load or charge associated therewith can be detected by the control as a touch action. The sensor electrodes are advantageously operated with an a.c. signal or a pulsed signal. Therefore, capacitive impedance changes can be detected. Current signals of individual a.c. cycles or individual pulse edges of a signal are then converted to digital countable signals in a current-to-digital converter. It is also possible to accumulate the charge from the current signals first in a detection capacitor and to digitize collectively.

The gap may have an approximately uniform width along its course. In this way, the shape or curve form of the gap according to its length is considered to be its course.

The gap can have a lateral extension relative to a substrate surface; correspondingly, when viewed from a perspective perpendicular to the substrate surface, the second electrodes are disposed next to the first electrode. Optionally, the gap can have a vertical extension relative to the substrate surface; in this case, when viewed from a perspective perpendicular to the substrate surface, the second electrodes are disposed electrically insulated above or below the first electrode.

A double-electrode sensor can be produced with Projected Capacitive Touch (PCT or PCAP) technology.

A single-electrode sensor can be designed as one open capacitor ("self-capacitance"). The word "one" indicates any arbitrary sensor present in the user interface and thus to any one of the sensors. Instead of two conducting or line elements as in a classical capacitor, the open capacitor has a single line element on which electrical loads are charged and discharged.

A double-electrode sensor is relatively insensitive to interference signals that are caused, for example, by electromagnetic radiation or contacts in the region of the leads, since only the sensor gap represents the active sensor surface; this can be important in an application in a cooking apparatus, in particular, for a one-layer layer structure. If a sensor operates in alternating manner as a single-electrode sensor (open capacitor) and as a double-electrode sensor (pcap), interference signals, which are caused, for example, by liquids, can be better discriminated, since the two types of sensors differently represent the signal ratio between operation and liquid; this can also be important in an application on a horizontal operating surface in a cooking apparatus.

The overlapping region between an electrode, preferably a first electrode of a double-electrode sensor or an electrode of a single-electrode sensor, and the display element can be found in an edge region of the display element. The overlapping region can thus be a strip-shaped region at the edge of the display element.

One electrode can be designed as an electrically conductive flat surface element that is disposed on the inner substrate surface.

One electrode can be connected to a control of the household appliance by means of a lead. The lead can be designed as an electrically conductive flat surface element that is disposed on the inner substrate surface. A contact zone between the lead and the control unit can be realized in a connection region outside an active operating region of the user interface, preferably on the inner substrate surface. In this case, that region of a substrate surface that corresponds to the operator surface can be viewed as the active operating region.

Preferably, an electrically conductive flat surface element can be transparent to visible light. It is therefore assured that in one arrangement of the flat surface element between the display element and the external region where the user is located, the user is not bothered or hindered by the flat surface element when s/he is looking at the display element. If an attenuation or change of the image perception that is mediated by the display element is acceptable, however, the flat surface element can also be partially transparent or opaque.

If the electrically conductive flat surface element does not have an overlapping region with the display element, the flat surface element can be opaque.

Depending on whether each electrode of the user interface can be formed as an electrically conductive flat surface element on the inner surface of the substrate, the embodiments of the flat surface element apply also to any electrode, including the first electrode, the second electrode, and the single electrode.

Preferably, the sensor is disposed directly or without intermediary on the inner substrate surface; the display element is disposed on the outer support surface, so that the sensor can be disposed between the inner substrate surface and the display element, as long as there is an overlapping region between display element and sensor.

A display element can be composed of a lighting means (for example, an LED chip), a light guide (for example, a reflector), a diffusion or scattering layer (for example, a coating of white color), and a masking in the region of the scattering layer. The masking determines the form of the luminous surfaces (for example, of a light segment of a segment display or of a symbol). Parts of the display element can be disposed on the inner substrate surface and another part can be disposed on the outer substrate surface. For example, but not exclusively, the masking can be embodied in a light-opaque color layer; the lighting means, the light guide, and the masking of the light guide in the form of a scattering layer can be introduced onto the outer substrate support.

The sequence of arrangement of the parts of the display element and the conductive flat surface elements on the inner substrate surface is arbitrary. For example, first a masking and a scattering layer of the display element can be introduced on the inner substrate surface; a transparent, conductive flat surface element, for example, can be introduced on top of this. Conductive flat surface elements can also be introduced as the first layer, for example.

The substrate can comprise one of the following materials: plastic, glass, glass ceramic, or a composite of the named materials. The respective substrate can be transparent, colored-transparent, or translucent.

The following types of glass are preferably used as the glass, e.g., alkali-free and alkali-containing glasses, silicate glasses, borosilicate glasses, zinc silicate glasses, zinc borosilicate glasses, bismuth borosilicate glasses, bismuth silicate glasses, aluminosilicate glasses, lithium-aluminosilicate glasses, soda-lime silicate glasses. The substrates can also be pre-stressed, e.g., chemically or thermally.

More preferably, a lithium aluminosilicate glass ceramic (LAS glass ceramic) is used as the substrate. This type of glass ceramic is marketed, for example, under the tradename CERAN®. The glass ceramic can be uncolored or can be transparent, and colored by means of metal oxides and/or heating processes. These glass ceramics are particularly well suitable both for cooking surfaces as well as for use as a substrate for the user interface. Here, in particular, the comparatively high dielectric constant (relative permittivity $\varepsilon_r$) typically from 7.8 to 8.2 of glass ceramics comes into play. Glass ceramics are very permeable to heat and temperature-stable, withstand abrupt temperature shocks undamaged in the range of up to plus 750° Celsius, and are also mechanically very durable.

The substrate preferably has a thickness in the range of 0.3-6.0 mm, preferably in the ranges of 2.8-4.2 mm, 3.8-4.2 mm or 2.8-3.2 mm.

A transparent, electrically conductive layer for the user interface can be applied onto a cooking zone substrate, preferably after application onto the inner substrate surface 12.2 of decorative, coloring, masking, barrier, and sealing layers, as a complete surface layer, and/or structured (e.g., by means of a laser) and/or recessed; i) in the case of substrates composed of colored glass-ceramic material and/or of colored glass material, preferably after the optional introduction of optical masking layers and/or filtering and/or balancing layers, barrier and/or sealing layers; ii) in the case of substrates made of uncolored glass-ceramic material and/or of uncolored glass material, preferably after the optional application of decorative, coloring, optical filtering and/or balancing layers, barrier and/or sealing layers.

A sequence of the layer structure, wherein, for example, the decorative and/or sealing layers are applied after the conductive layer, and i) the conductive layer is applied as structured and/or as a complete surface layer, and/or recessed, prior to applying the other layers, and/or ii) the entire layer structure or parts of the layer structure is/are subsequently structured (e.g., laser), is also possible. An opaque conductive layer can be applied in both cases before or after the application of the transparent, conductive layer. If opaque conductor layers should not be visible in the external region in the case of substrates made of uncolored glass-ceramic materials or uncolored glass materials, then the conductive layer is applied after the coloring coating, as long as it is not concealed by a top-side decoration. In addition, a sealing layer can be applied onto the opaque or transparent conductive coating for its protection. The described combinations of the conductive layer with decorative and sealing layers in each case have an overlapping in the edge region of the printed layers, so that a homogeneous transition can be assured.

The display element can comprise a light pictogram, an alphanumeric counting display, in particular, a segment display, a row of light segments (a so-called slider) or an arc of light segments or a ring of light segments (ring slider), a light field or a pixel-based display element. The light pictogram can represent, for example, power switches, plus/minus keys or key switches. The alphanumeric counting display can comprise a seven-segment display. A row or an arc of light segments is composed of one or more luminous surfaces that indicate a setting range, such as, for example, setting the power in a cooking zone. The display element can be based on an LED or an OLED light source. A pixel-based display modulus can be used as a display of a setting range, which represents alphanumeric or freely selectable symbols, for example, a back-lit LCD matrix or a light-point matrix or an OLED matrix.

The substrate can be provided with tactile markings, such as a finger recess or a straight or curved depression for finger guidance, or surface structures or bulges, on the outer substrate surface in the region of (each) display element.

A transparent thin film can be applied by means of vapor deposition in order to apply an electrically conductive coating onto the substrate, this thin film comprising: metals, preferably silver, copper, gold and/or transparent semiconductors, preferably indium-gallium-zinc oxide, and/or transparent, conductive oxide layers, preferably tin-doped indium oxide or $In_2O_3$:Sn, fluorine-doped tin oxide or $SnO_2$:F, antimony-doped tin oxide or $SnO_2$:Sb, aluminum-doped zinc oxide or ZnO:Al, doped titanium oxide, niobium-doped titanium dioxide or $TiO_2$:Nb, tantalum-doped titanium dioxide or $TiO_2$:Ta, gallium-doped zinc oxide or ZnO:Ga, molybdenum-doped zinc oxide or ZnO:Mo, or molybdenum-doped indium oxide or $In_2O_3$:Mo.

Additionally, one or more barrier layers can be applied onto the substrate by means of vapor deposition before and/or after the deposition of the transparent conductive coating, this barrier layer comprising: oxides, preferably $SiO_x$, $Al_2O_3$ and/or nitrides, preferably SiN and/or oxynitrides, preferably $SiO_xN_y$.

One of the following methods can be conducted for applying a complete-surface or structured, electrically conductive, transparent or opaque coating onto the substrate by means of printing: screen printing, doctor blade, inkjet printing, offset printing, gravure printing, flexographic printing, transfer printing or pad printing.

For producing a transparent, conductive coating, preferably by means of printing, an ink comprising one or more electrically conductive additive(s) or a conductive polymer and a solvent can be applied onto the substrate, whereby the solvent is preferably evaporated after applying the ink. In this case, the electrically conductive additives are incorporated in electrically non-conductive binding agents, such as polyacrylates, polycarbonates, polyurethanes, polyureas, epoxy systems, silicone resins, silicones, polyester resin or sol-gel matrices. Also suitable are inks or pastes that contain electrically conductive polymers, such as, for example, poly(3,4-ethylenedioxythiophene)/polystyrene sulfonate.

Inks or pastes that contain electrically conductive polymers can additionally contain other conductive additives.

For example, thin opaque lines of less than 500 µm in the form of mesh-like structures (wire mesh) can be printed by means of an ink or a paste, whereby the ink or paste preferably contains metal nanoparticles, more preferably nanoparticles of silver, copper, and/or carbon. In a particular embodiment, these thin lines can be sharpened still further by means of laser ablation (reduction of the edge roughness), and/or thinned. An application of inks and/or pastes, particularly opaque inks and/or pastes, can be carried out, e.g., by means of inkjet printing, pad printing, and/or transfer printing.

The inks can comprise a matrix material for improving the performance characteristics of the transparent conductor surface with respect to scratch resistance or stability against steam. In addition, the inks may contain thickeners, leveling agents, defoamers, dispersing agents, and other additives.

The conductive additive can comprise fiber-like conductive particles, in order to make possible a formation of conductive networks, wherein fibers of the additive have an average diameter of <500 nm, preferably <=200 nm, more preferably <100 nm. These guarantee a good electrical conductivity, whereby a high transmission is also maintained due to the nanoscale dimensions.

A length/diameter aspect ratio of a fiber can lie in a range of 50-10,000, preferably between 85-1000.

The conductive additive, however, can also comprise spherical particles, nanoparticles, or flat particle pieces (so-called flakes).

The electrical resistance of the conductive coating can also be adjusted by the concentration of the conductive additive.

The additive can comprise at least one of the following materials: metal nanowires or nanotubes; inorganic materials or particles, preferably metals, alloys, non-oxide or oxide materials, with fiber-like morphology; a metal selected from a list comprising: silver, copper, gold, aluminum, nickel, platinum, palladium, or an alloy of metals from this list; coated metal nanowires, in particular nickel-coated copper nanowires or polymer-coated metal nanowires; conductive, doped oxide particles and oxide nanoparticles, and/or nanowires, in particular, $In_2O_3$:Sn, ZnO:Al, $SnO_2$:Sb; carbon nanomaterials, in particular, single-walled and multi-walled carbon nanotubes, graphene; inorganic, non-oxide nanowires, in particular, metal chalcogenides; fibers made of conductive polymers.

The matrix material can comprise at least one of the following materials: UV-curable or heat-curable polymers; UV- or thermally organically crosslinkable, hybrid-polymeric sol-gel materials; hybrid-polymeric sol-gel materials; nanoparticle-functionalized sol-gel materials; sol-gel materials with nanoparticle fillers and/or inorganic sol-gel materials; electrically conductive sol-gel materials; electrically conductive polymers; glass fluxes or glass frits.

For producing an opaque, conductive coating, preferably by means of printing, an ink comprising electrically conductive additives and a solvent can be applied onto the substrate, whereby the solvent is preferably evaporated after applying the ink. The electrically conductive additives can be based on nanoscale and microscale carbon, such as carbon black, CNTs, fullerenes, or graphite. In this case, the electrically conductive additives are incorporated in electrically non-conductive binding agents, such as polyacrylates, polycarbonates, polyurethanes, polyureas, epoxy systems, silicone resins, silicones, polyester resin, sol-gel matrices.

For producing an opaque, conductive coating, a material comprising silver, gold, or copper can also be applied by means of vapor deposition, e.g., by sputtering.

In addition, opaque, electrically conductive layers can be composed of noble-metal nanoparticles, such as Au or Ag or Cu, and a glass flux and/or organic binder. Opaque electrically conductive layers based on conductive silver pastes, aluminum or copper pastes can also be applied.

The conductive layers (transparent and opaque) can also be structured subsequently after their application. Here, whether they are applied already structured in a printing process (e.g., screen printing) or are structured by masking during sputtering does not play a role. In the latter case, the subsequent structuring represents an additional structuring step. The structuring of the conductive layers can be produced, for example, by laser ablation or lithographically.

The invention will be explained in more detail below on the basis of embodiment examples and with reference to the drawings. Here, the same reference numbers refer to the same or corresponding elements. The features of different embodiment examples may be combined with one another.

BRIEF DESCRIPTION OF THE DRAWINGS

FIG. 6a shows a schematic representation of an operating panel;

FIG. 6b shows a cooking surface with an operating panel;

FIG. 7c shows another touch-sensitive slide control;

FIG. 7d shows another touch-sensitive roll control;

FIG. 8 shows a sensor field on a film or glass support film;

FIG. 10a shows a user interface having a display element with a functional sensor electrode;

FIG. 10b shows a user interface having a display element with a different functional sensor electrode;

FIG. 10c shows a user interface having a display element with another different functional sensor electrode; and FIG. 10d shows a user interface having a display element with a yet another different functional sensor electrode.

DETAILED DESCRIPTION

Figure 1A:
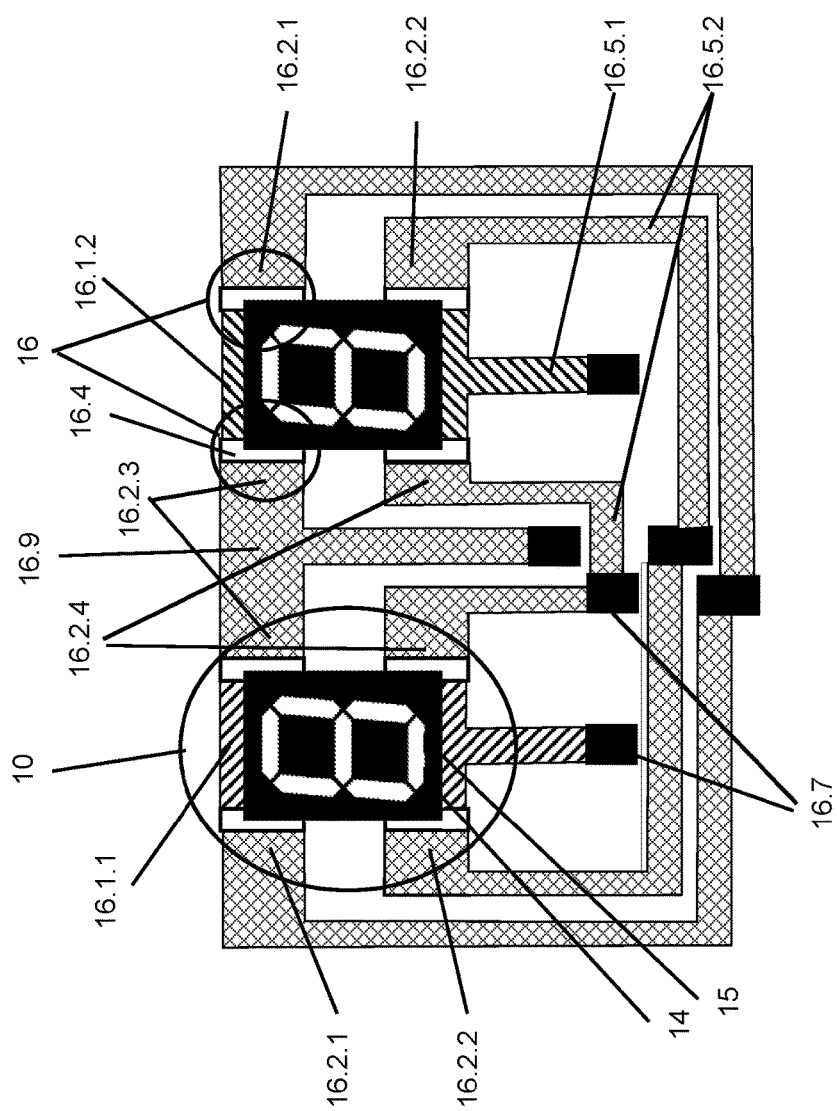
FIG. 1a shows a user interface, having a display element and a double-electrode arrangement with 2:N structure in a top view.
Figure 1B:
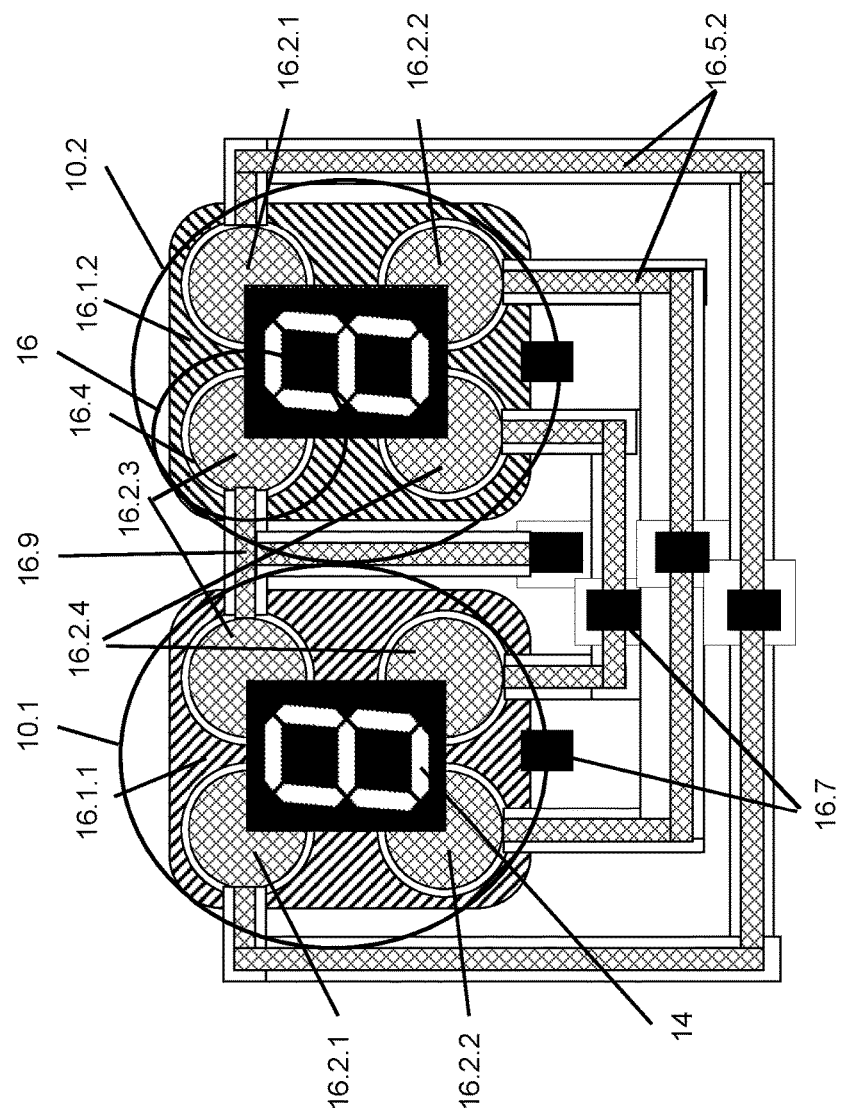
FIG. 1b shows another user interface having a display element and a double-electrode arrangement with 2:N structure in a top view.
Figure 3A:
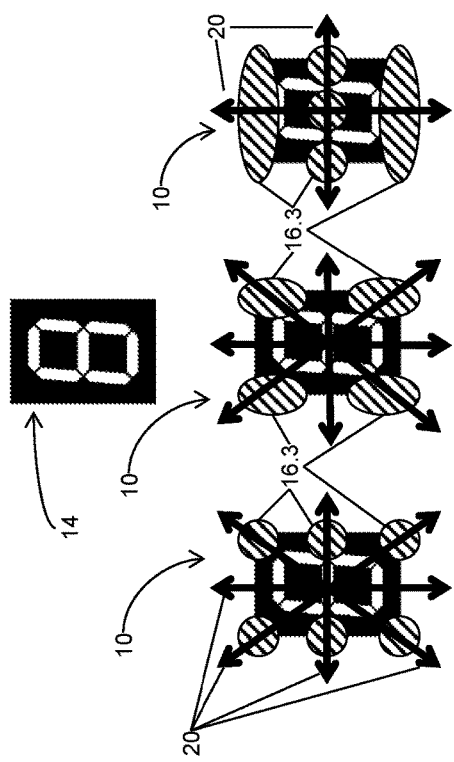
FIG. 3a shows an embodiment of a user interface having a single-electrode arrangement.
Figure 3B:
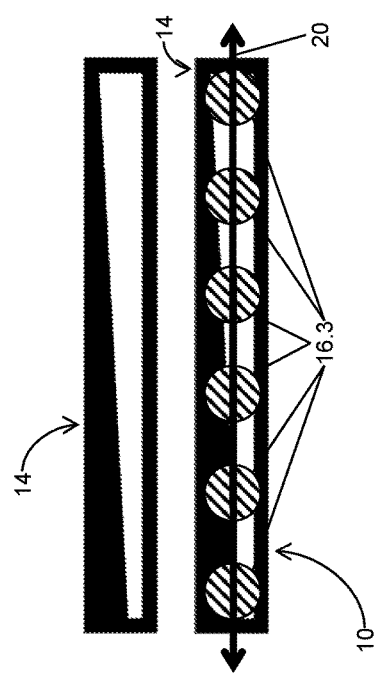
FIG. 3b shows another embodiment of a user interface having a single-electrode arrangement.

FIGS. 1a, 1b show an arrangement with two user interfaces 10, each of which has a display element 14 with double-electrode sensors 16 in a double-electrode arrangement with 2:N structure, and FIGS. 3a, 3b show user interfaces 10 having single-electrode sensors 16.3 in single-electrode arrangements. The user interfaces 10, as shown in FIG. 6b, are suitable for a cooking surface 8 of a cooking apparatus.

A user interface 10 comprises the following components (see also FIG. 2): a preferably planar support 13 with an outer support surface 13.1 facing an external region 19; a preferably planar substrate 12, which is transparent at least in sections, having an outer substrate surface 12.1 facing the external region 19, more preferably in the form of a plate or panel of glass or glass ceramic, and an opposite-lying inner substrate surface 12.2 facing away from the external region 19 and facing the outer support surface 13.1; a display element 14 for presenting information, which is preferably disposed on the outer support surface 13.1 and affixed to support 13; and a sensor arrangement having at least two sensors 16, each of which has at least one electrode 16.1, 16.2; 16.3, the sensors being disposed on the inner substrate surface 12.2, for interaction with a user located in the external region 19.

The display element 14 can also be disposed on the inner support surface 13.2 and can present information in the direction of an external region 19 through an opening in the support or through a transparent support.

The substrate 12 has an operator surface 12.1, which is facing the external region 19 and the user, and which the user can touch for control of the household appliance. The inner substrate surface 12.2, on which sensors 16 are disposed, is facing away from the external region 19 and the user, and is thus found on the opposite-lying side of the operator surface 12.1.

A double-electrode sensor 16 (see FIGS. 1, 2) comprises a first electrode 16.1.1, 16.1.2 and second electrodes 16.2.1-16.2.4, which are distanced from the first electrodes 16.1.1, 16.1.2 by a gap 16.4, whereby each of the double-electrode sensors 16 at a display element 14 comprises the same first electrode 16.1.1 or 16.1.2 in each case. The double-electrode sensor 16 is designed as a capacitively acting sensor element. The double-electrode arrangement comprises four double-electrode sensors 16 per display element 14.

The double-electrode arrangement has the structure of a 2:N matrix for the paired user interface, wherein the first electrode 16.1 stands opposite a plurality of second electrodes 16.2. Viewed from the top, i.e., from a perspective in the external region, above the outer substrate surface, looking approximately perpendicularly onto the outer substrate surface, the first electrodes 16.1.1, 16.1.2 and each of the second electrodes 16.2.1-16.2.4 are separated by the respective gap 16.4. The surface of an electrode pair 16.1.x and 16.2.x (or a single electrode 16.3) preferably amounts to 0.2-4.0 cm$^2$, more preferably 0.4-1.0 cm$^2$. The gap 16.4 has a lateral extension along the inner substrate surface 12.2. The gap width preferably amounts to 5 μm-2 mm in the case of a structured application method (e.g., screen printing), more preferably 0.2-1.0 mm; in the case of a downstream structuring step (e.g., laser ablation), it amounts to preferably 5-200 μm, more preferably 5-100 μm, most preferably 10-30 μm; viewed from the top, the second electrodes 16.2 are correspondingly disposed next to the first electrode 16.1.

The first electrode 16.1 overlaps the display element 14 in an overlapping region, and the second electrodes 16.2 are disposed outside the display element 14. The overlapping region can have a percentage value that lies between 0 and 100. Other than as shown, the first electrode can also be larger than the display element 14. The overlapping region in this case would have a value of 100 percent of the surface of the display element 14, since the display element 14 would be completely covered.

The first electrode 16.1.1 or 16.1.2, respectively, and the second electrodes 16.2.1-16.2.4 are designed as electrically conductive flat surface elements disposed on the inner substrate surface 12.2. The first electrode 16.1 is transparent to visible light according to one embodiment of the invention. According to another embodiment, the first electrodes 16.1.1, 16.1.2 may also not cover the display element completely, so that light of the display element 14 can pass by the electrode and is visible to an observer. For example, for this purpose, the first electrode can have the shape of a thin grid, or a frame or arc, which is not visually striking and which surrounds the luminous surface at least partially.

The second electrodes 16.2.1-16.2.4 can be transparent or opaque to visible light, each time depending on whether they overlap the luminous region 15 (dashes) of the display element 14.

Figure 2:
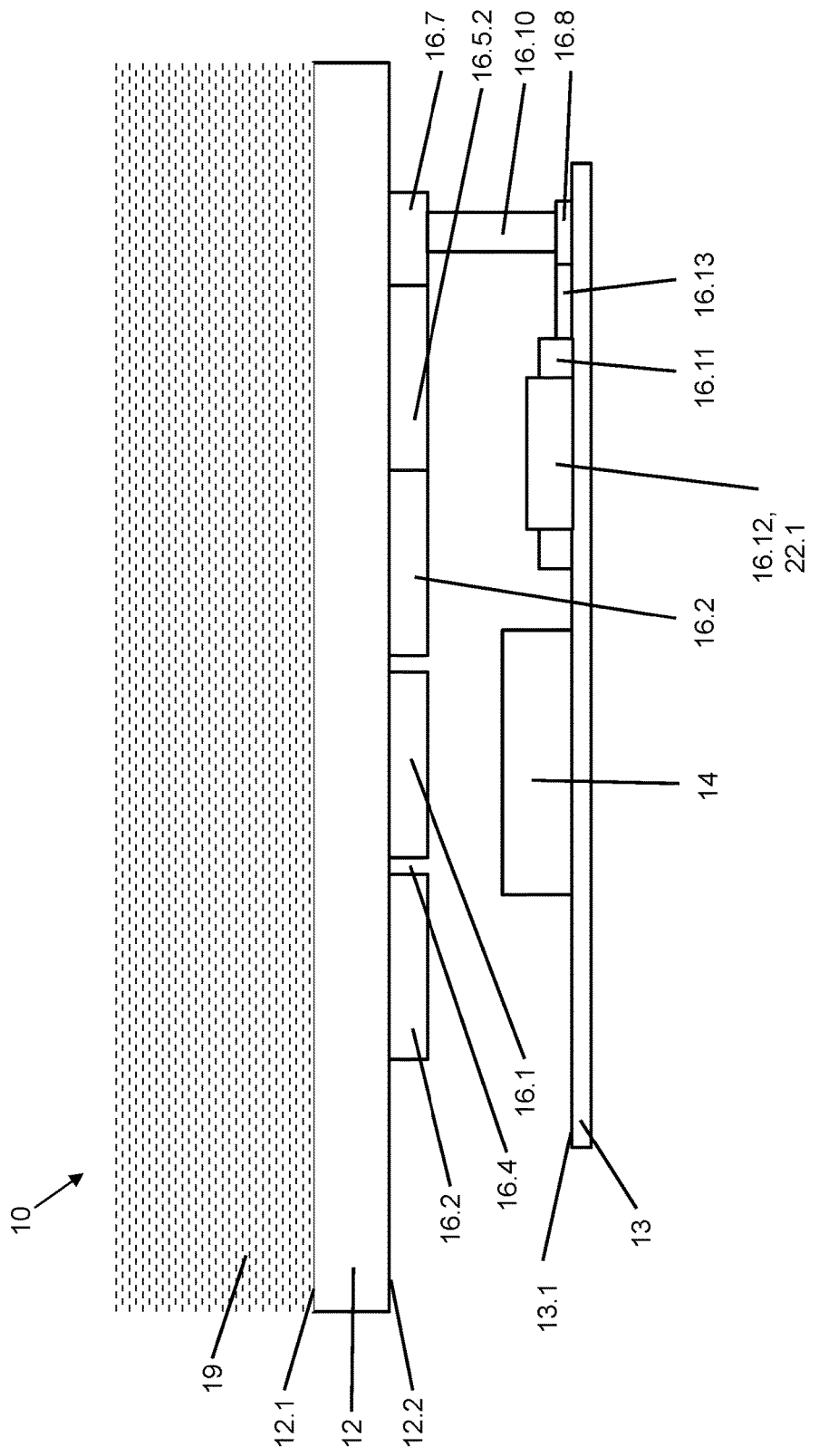
FIG. 2 shows a user interface in a lateral view.

It is thus assured that with an arrangement of the flat surface elements according to FIG. 1 and FIG. 2 between the display element 14 and the external region 19, in which the user is located, the user will not be bothered or hindered by the first electrode 16.1 and the second electrode 16.2 when observing the display element 14.

The first and second electrodes 16.1, 16.2 are connected to contact points 16.7 by means of electrode leads 16.5, 16.6. Contact elements 16.10 produce a conductive connection between the contact points 16.7 on the substrate and the contact points 16.8 on the support (FIG. 2). The contact points 16.8 are connected via conductor tracks 16.13 to connection points 16.11 of an electronic component 16.12, which forms part of a detection device 22.1 of the user interface 10, or forms this detection device 22.1. The leads 16.5, 16.6, the contact points 16.7 are designed as electrically conductive flat surface elements that are disposed on the inner substrate surface 12.2; the contact points 16.8 are designed as corresponding flat surface elements on the support top side 13.1.

Without limitation to the example shown in FIG. 2, according to one embodiment of the invention, the detection device 22.1 is provided for detecting and evaluating sensor signals, wherein a signal of a sensor 16 of a sensor arrangement of the operator interface that is preferably disposed on the edge, has a time delay when compared to a signal of another sensor of a sensor arrangement which is preferably also disposed on the edge, and the detection device 22.1 is designed for the purpose of adjusting or of changing a control value in response to the time delay, preferably for controlling the display element 14. The time delay of the sensor signals is caused by acting on the operator interface by means of a swiping gesture executed by the user. The detection device can also be designed, in particular, as a control device, in order to set a power or a timer. The power can be, in particular, the power of a cooking zone. Thus, the operator interface can be operated by means of a swiping gesture, in such a way that, by means of a swiping gesture above a display element, which displays an instantaneous value of the power, on the one hand, this display value, and, on the other hand, the instantaneous value of the power, are incremented or decremented. As is also the case in the example shown in FIG. 2, the detection device 22.1 is preferably disposed on the support 13. The support 13 thus forms an electronic unit with devices for evaluation of the information being shown. Sensor signals, generation of control values and display of the set values.

The conductive flat surface elements 16.1 to 16.7, 16.9 can be applied onto the substrate, preferably directly, roughly in the form of deposited conductive layers. They can also be disposed on a film or glass support applied onto the substrate or a support made up of layers of several films and/or glasses, or integrated in the film or glass support. An electrode that is disposed directly on the substrate is particularly advantageous with respect to its dielectric coupling properties. In contrast, a vertical gap or a bonding layer between electrode and inner substrate surface can reduce the capacitance. The display element can be directly in contact with the substrate or can be at a distance from it.

If the conducting surfaces 16.1 to 16.7, 16.9 are disposed on a film or glass support, they can i) be applied, as described, disposed around the display element 14 of the user interfaces, or the sensors 16 are ii) applied in one layer or iii) at least two layers are applied in a regular grid. i) and ii) can be formed as single-electrode or double-electrode sensors. In a multilayer arrangement iii), the gaps 16.4 are vertical or are a combination of vertical plus lateral gaps between two layer supports, for example, between the vertically overlapping intersections of row and column electrodes, or between diamond-form row and column electrode chains, which are applied in two layers, disposed essentially non-overlapping, predominantly laterally. Then the sensors, which are overlapping and lay in the edge region of the display elements, are operated as a unit with the respective display element as an operator interface. From the electrodes of sensors 16 disposed in the grid, the electrodes matching the display element 14 with respect to their position are evaluated and their operating signals are assigned to the respective display element 14 and the latter is actuated correspondingly in its display function. Electrodes and sensors that are present on the glass or film support and are not selected remain unutilized relative to the defined operator interfaces. The assignment of the sensor electrodes to the display elements 14 is preferably carried out in the control unit. In fact, this is an apparent disadvantage, since more electrodes are produced than necessary; of course, this embodiment makes possible a standardized sensor surface, which can be manufactured in large lot numbers cost-effectively, and it makes possible a high flexibility with respect to the arrangement of the light-emitting elements under the operator surface. Lastly, in this way, a support with display elements disposed arbitrarily and matching the electrodes can be interconnected for the formation of a user interface.

FIG. 8 shows such an embodiment in plan view. An operating field 21 in the form of a film or glass touch screen on which the sensors 16 are constructed from electrically conducting flat surface elements in a regular grid is applied onto substrate 12. Suitable contact elements or connectors are present on the support 13, in order to contact the flat surface elements when the support 13 having contact elements or ribbon conductors or film connections is introduced. After the support 13 is affixed, the sensors 16 matching one display element 14 are allocated in the control unit. These sensors 16 matching the display elements 14 are shown by the hatching in FIG. 8.

Contact zones can be designed for galvanic or capacitive coupling. A galvanic coupling can be provided via contact springs or conducting foams, which are introduced on the support. The display elements 14 and the control unit 22.1 and the contact points 16.8 can be disposed on one support or on different supports. The support can be formed as a rigid circuit board, for example made of FR4 material, or as a flexible, for example, film-based circuit board. It can also be formed from technical ceramics, glass ceramics, glass, thermoplastics, thermosetting plastics, elastomers, electrical insulating paper. If the contact zone is provided with an electrically insulating protective layer, then with contact elements of the same type, which lie flat on the protective layer at the site of the contact zones, a capacitive coupling can be provided for the contact zone.

Additionally, conductive surfaces that are used for screening the named elements can be introduced.

The substrate 12 comprises a glass ceramic, since the latter is particularly well suitable for cooking surfaces.

The display element 14 shown in FIG. 1 is designed as an alphanumeric counting display.

FIG. 2 shows an arrangement of double-electrode sensors in a lateral view, wherein a sensor 16 is disposed on the inner substrate surface 12.2, which lies opposite the operator surface 12.1, and thus faces away from the external space 19. The sensor 16 is disposed on the bottom side 12.2 of the substrate, and the display element 14 is disposed on an outer support surface 13.1 of the support 13. The electrodes 16.1, 16.2, the lead 16.6, and the contact points 16.7 are disposed directly on the substrate 12 as flat surface elements, but the user, upon acting on the user interface 10, does not touch either the display element 14 or the sensor 16, but rather the substrate 12 on its outer side 12.1. The electrode 16.1 is transparent to visible light in this embodiment, in order not to adversely affect the perception of the image shown by the display element 14. The sensor resolution is carried out at gap 16.4 between the electrode surfaces 16.1 and 16.2.

FIGS. 3a, 3b show schematic representations of user interfaces 10 having sensors 16 comprising single electrodes 16.3, these sensors being disposed in single-electrode arrangements. Since a sensor 16 is represented each time by its single electrode 16.3, in these figures, the reference numbers for the sensors are not indicated. Without limitation to the particular embodiment examples, the single electrodes 16.3 can be at least partially transparent, preferably transparent to light in a visible wavelength region, or can have an opening, so that the display element 14 is visible through the electrode 16.3.

A single-electrode sensor 16 having a single electrode 16.3 is designed as a capacitive touch sensor. The single electrode 16.3 overlaps with the luminous region 15 of the display element 14 in an overlapping region.

The sensor gap 16.4 is represented symbolically as a rectangle in FIG. 1a. It can be designed, for example, as a straight gap, or as a meandering gap. In FIG. 1b, the second sensor electrodes 16.2.x are designed as circular in shape, each of which is surrounded by first sensor electrodes 16.1.x. The sensor gap 16.4 is designed as a circular-shaped gap surrounding the sensor electrodes 16.2.x. The first electrodes 16.1.x operate as transmitting electrodes; the second electrodes 16.2.x act as receiving electrodes of pcap sensors. The second electrodes 16.2.x are advantageously of small surface and are surrounded by first electrodes 16.1.x, so that s parasitic impedances of the second electrodes 16.2.x relating to the other surroundings are reduced.

In the configuration according to FIG. 1b, the electrode arrangement can also be operated as a single-electrode arrangement. The electrodes 16.2.1-16.2.4 can form single electrodes of a sensor 16; the electrodes 16.1.1 and 16.1.2 can form screen and/or shield electrodes and/or single electrodes of a proximity sensor. For example, upon touching the electrode 16.2.3, it is indistinguishable at first whether the user interface 10.1 or 10.2 is acted on. For this purpose, for example, three electrode controls can be used individually or in combination intermittently for the single electrode actuation of electrodes 16.2.n, in order to distinguish between an operation on user interface 10.1 or 10.2. First, an operation of a sensor electrode 16.2.n resolves a different signal shift as a function of whether the surrounding electrodes 16.1.1 and 16.1.2 are actuated with a fixed potential, preferably a ground potential (screen electrode) or whether they are actuated with the same sensor signal of electrodes 16.2.n (shield electrode).

In the case of an actuation as a screen electrode, strong parasitic, capacitive impedances and field distortions form in the direct vicinity of the electrode 16.2.n, and these reduce the signal shift of an operation when compared to an operation with surrounding shield electrodes. Secondly, the electrodes 16.1.x can be actuated as a screen electrode/shield electrode and intermittently as a single electrode proximity sensor. Thus, with intermittent actuation of the electrodes 16.1.x as a proximity sensor, a distinction can be made of whether the operator approaches the operator interface 10.1 or 10.2 prior to the actual touch contact. Thirdly, the electrodes 16.1.x can be actuated as a screen electrode/shield electrode and intermittently as a single-electrode sensor. Thus, with intermittent actuation of the electrodes 16.1.x as a single-electrode sensor, it can be distinguished whether the operator touches the region of interface 10.1 or 10.2. Preferably, in this actuation phase, the electrodes 16.2.n are actuated, interconnected as a screen electrode.

The surface shaping of the electrodes 16.1.x is not limited to the configuration of FIG. 1b. The electrode surfaces can extend circumferentially in order to additionally envelop the lead region 16.5.2, in particular, which brings about an improved screening of the leads 16.5.2 against interference fields and an erroneous operation due to unintentional contact by the user.

The display element 14 shown in FIG. 3a is designed as an alphanumeric counting display. The display element 14, which is shown in FIG. 3b and is designed as a row of light segments, represents a slide control for setting the power in a cooking zone 8. In each case, respectively, 6, 4 or 5 single electrodes 16.3 (in FIG. 3a) or 6 single electrodes 16.3 (in FIG. 3b) are assigned to one display element 14.

The execution of a sliding, contacting movement or swiping gesture conducted in any arbitrary direction 20 by the user above the operator surface in one region of the display element 14 of FIG. 3a causes a change in charge on the single electrodes 16.3 and thus a change in the signal of the sensor 16. Each time depending on position and/or direction of motion 20 of the user's hand, there is control of which of sensors 16 emits a signal and with what signal parameters. In this way, the one control connected to the user interface 10 can control the cooking apparatus according to the desires of the user. The value of the controlled parameter, for example, heating power, which is established on the basis of the swiping gesture, can be displayed by means of the alphanumeric counting display 14.

Double-electrode sensors, as they were explained on the basis of FIG. 1, may also be used instead of the single-electrode sensors in the examples shown in FIGS. 3a and 3b.

Figure 7B:
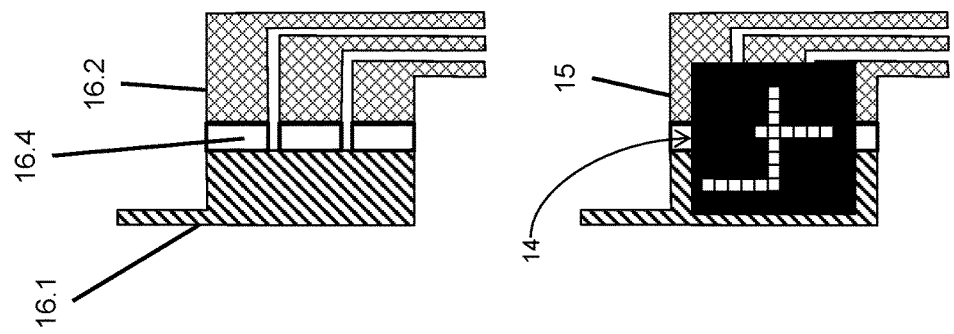
FIG. 7b shows a touch-sensitive roll control.
Figure 7A:
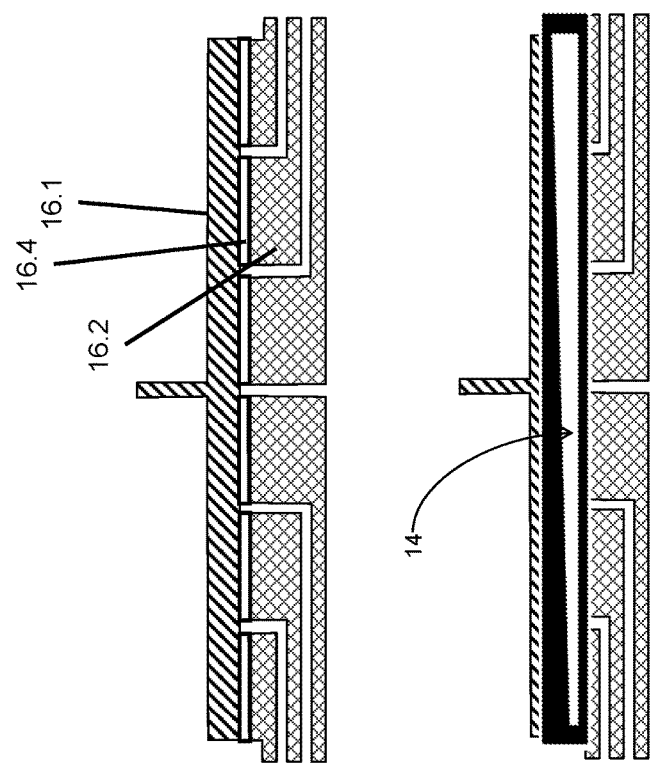
FIG. 7a shows a touch-sensitive slide control.

In the case of the touch-sensitive slide control shown in FIGS. 7a and 7c, the heating power of the cooking apparatus can be changed by means of a swiping gesture from left to right or vice versa, along and directly above the region shown of the display element 14. Likewise, the detected and set value is displayed by means of the display element 14; a length of the displayed horizontal bar, which corresponds to the position of a virtual operator control, represents the detected or set value. In the case of the pixel display, three sensors are disposed vertically along the central axis as alpha-numeric power displays (FIGS. 7b and 7d). These permit a vertical rolling-swiping gesture down/up, which increments the display value down/up.

In FIGS. 7a and 7b, the conducting flat surface elements of electrodes 16.1 and 16.2 overlap with the luminous region 15 (dashes) of the display elements 14. The flat surface elements are advantageously designed as transparent conductive layers. In FIGS. 7c and 7d, the conducting flat surface elements of electrodes 16.1 and 16.2 do not overlap with the display element 14 and its luminous region 15 and can be designed here as opaque conductive layers. If the conductive layers extend into the region of the sensor gap 16.4 and overlap with the luminous region 15 of the display element 14, these are formed as transparent conductive layers.

Figure 4A:
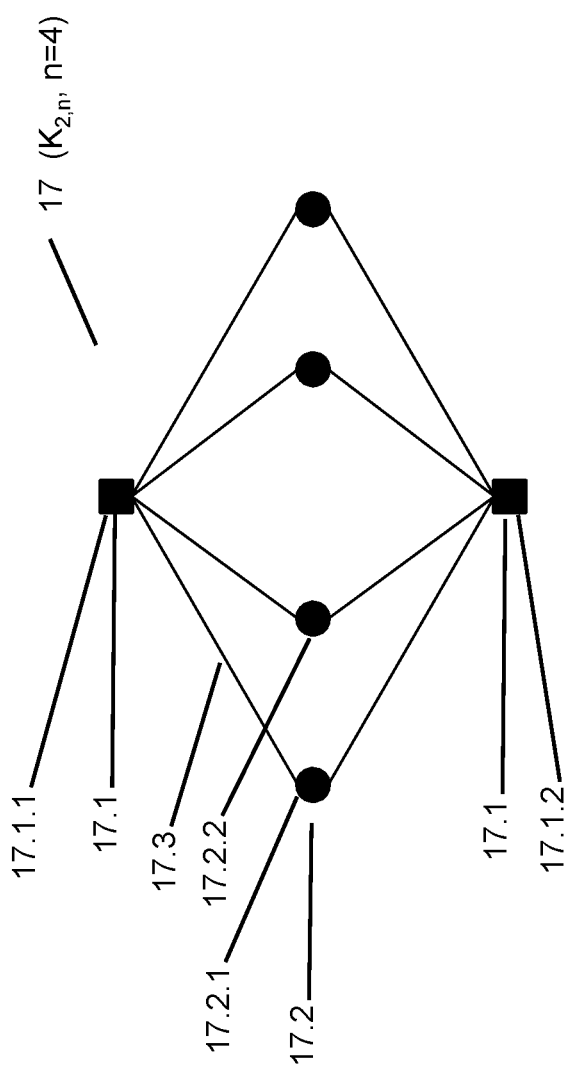
FIG. 4a shows a planar, complete, bipartite graph $K_{2,4}$, und a graph $K_{2,4}*$ expanded by node splitting.
Figure 4B:
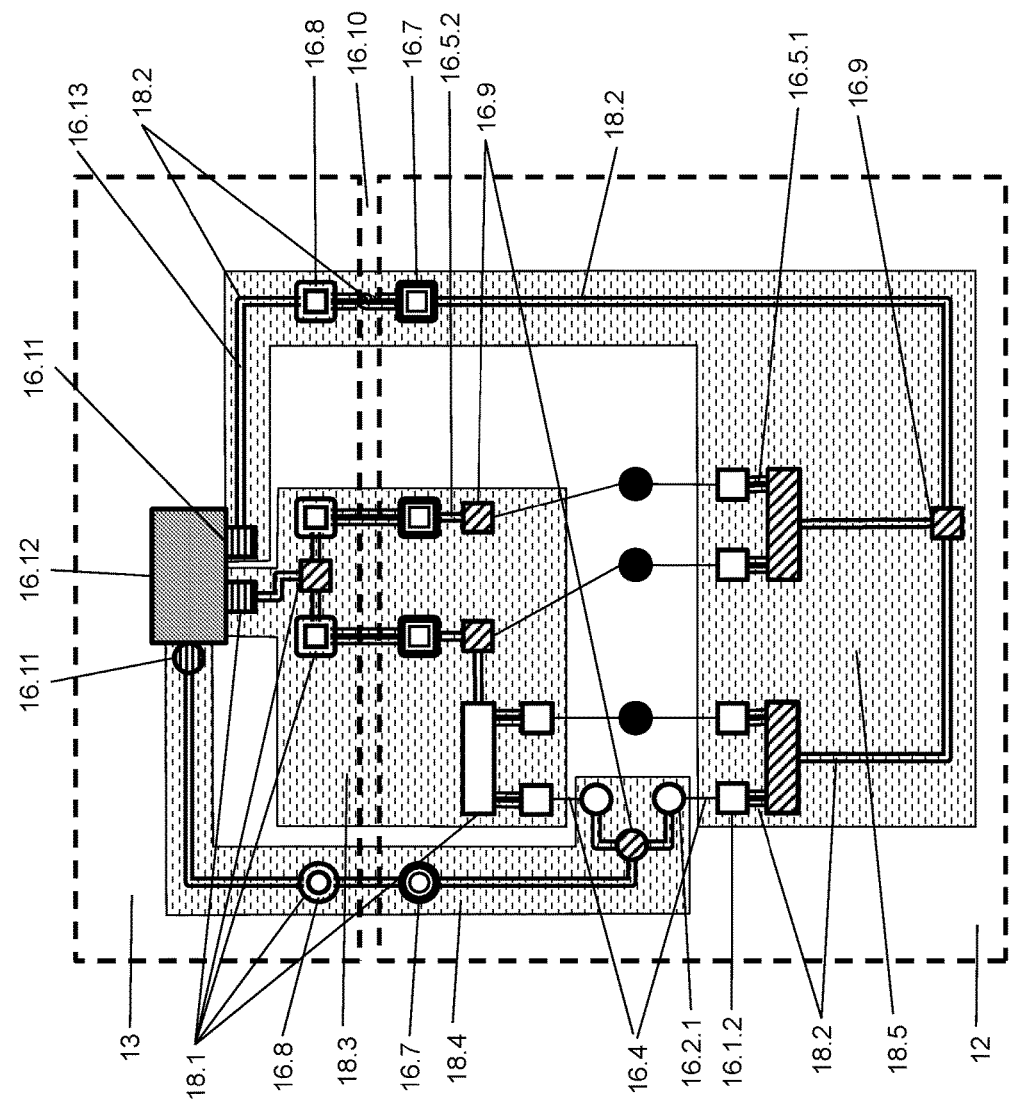
FIG. 4b shows another planar, complete, bipartite graph $K_{2,4}$, und a graph $K_{2,4}*$ expanded by node splitting.

FIGS. 4a and 4b illustrate the basic structure of the double-electrode arrangement by bipartite graphs, in comparison to FIG. 1 and FIG. 2. In a double-electrode arrangement, the electrodes 16.1 and 16.2 and the leads 16.5 and 16.6 and the connection points 16.9 and the contact points 16.7 are preferably shown in one plane as electrically conductive surfaces. The arrangement and interconnection as crossing-free conductor surfaces can be described with the help of mathematical graph theory. The representation of the electrically conductive surfaces and their crossing-free interconnection in one plane will be described by a planar graph.

For double-electrode arrangements, the conductor surfaces represent bipartite graph $K_{m,n}$ 17 (FIG. 4a), wherein the m first electrodes 16.1.1, 16.1.2 correspond to a first node set 17.1.1, 17.1.2, and the n second electrodes 16.2.1 to 16.2.4 correspond to a second node set 17.2. The sensor gaps 16.4 correspond to the edges 17.3 of the bipartite graph. Graph theory permits node splitting, without changing the graph theory properties of a $K_{m,n}$ graph. Additional edges are formed between the split nodes. The graph $K_{m,n}$ (FIG. 4a) is designated minor from a graph $K_{m,n}^*$ expanded by node splitting (FIG. 4b). According to graph theory, the two graphs in FIG. 4a and FIG. 4b are complete, bipartite $K_{2,4}$ graphs with identical properties, which image or map the structure of the conductor surfaces in FIG. 1. In the sense of such splittings 18.3, 18.4 und 18.5, in each case, a single node, e.g. node 17.1 is to be understood as a splitting 18.3, of the minor graph $K_{m,n}$ as a network made of nodes 18.1 and edges 18.2, connected conductively under one another, which represents different components in the physical conversion: nodes are a sensor electrode 16.1 or 16.2, branch nodes 16.9, contact points 16.7 on the substrate 12, contact points 16.8 on the support 13, and connection points 16.11 of an electronic component 16.12; edges are leads 16.5 or 16.6 between sensor electrodes 16.1/16.2, branch nodes 16.9 and contact electrodes 16.7, as well as contact elements 16.10 between contact electrodes 16.7 on the substrate 12 and contact electrodes 16.8 on the support, as well as conductor tracks 16.13 between contact electrodes 16.8 on the support and a connection point 16.11 of an electronic component 16.12 on the support 13.

A crossing-free configuration of all conductive flat surface elements in the form of a planar bipartite graph is particularly favorable, in order to be able to dispense with crossovers of conductors that are costly to produce on the substrate in the manufacture of the electrodes. In particular, crossing-free includes the case when no conductor (any arbitrary edge of the graph) passes through a sensor gap 16.4 (no crossing of any edge with an edge 16.4).

According to one embodiment of the invention, which is also realized in the configuration of FIG. 4b, it is therefore generally provided that the arrangement of all conductive flat surface elements of the arrangement of sensors 16
i) between the connection points (16.11) of electronic components (16.12) and/or
ii) between the contact points (16.7) are designed crossing-free as a planar, bipartite graph $K_{m,n}$, preferably with m=2, thus as a planar, bipartite graph $K_{2,n}$, more preferably as a planar, complete, bipartite graph $K_{2,N}$.

Also, a small as possible ratio V is advantageous, with V=A/D where
A=number of connections=number of nodes
D=number of double-electrode sensors 16=number of edges that represent one sensor-gap 16.4.

A small ratio V reduces the number of connections for a specific number of double-electrode sensors, and is thus preferred as cost-effective. In the sense of a ratio V that is as small as possible, a "square" matrix arrangement would be preferred as the bipartite graph $K_{n,n}$, with $A_{n,n}$=2n and D=$n^2$ and $V_{n,n}$=$2n/n^2$=$2/n$. Of course, only complete, bipartite graphs $K_{2,n}$, with any arbitrary n, are still planar, i.e., can be represented crossing-free in one layer plane, which can again be shown as cost-effective. Even a complete graph $K_{3,n}$, n>2, can no longer be shown as planar, thus crossing-free.

Graphs $K_{m,n}$, m,n>2 can also be represented crossing-free, of course, if they are not complete. Alternative embodiment variants in the sense of the invention result therefrom. In graph theory, complete means that each node n is joined to each node m by an edge.

Crossing-free representations are a preferred variant for the invention, since methods for representing the conductive layer plane can be implemented in a simpler, more error-tolerant, and cost-effective manner than a representation that is not crossing-free. The preferred representation is defined overall in first priority as a crossing-free structure, subordinated in second priority as a representation having a ratio V that is as small as possible.

It results therefrom that the embodiment of the preferred structure of the conducting surfaces in a double-electrode arrangement in a layer plane is preferably a complete, bipartite graph $K_{2,n}$. This corresponds to a 2:N matrix arrangement of the sensor electrodes. The graph is composed of two split node networks of nodes 16.1.1 and 16.1.2 of the first node set and n split node networks of nodes 16.2.n of the second node set. The number D of double-electrode sensors 16 amounts to $D_{2,n}$=2n; the number of connection points amounts to $A_{2,n}$=2+n; the ratio $V_{2,n}$=(2+n)/2n.

An electrode arrangement cannot always be represented as a complete graph $K_{2,N}$. An uneven number of operator interfaces can still be represented by a 2:N/2 matrix of a single operator interface as a part of a complete $K_{2,N}$ graph; an uneven number of second N electrodes only permits an incomplete $K_{2,N}$ graph.

In comparison, the following is valid for 2n double-electrode sensors in $K_{2,n}$ and a square $K_{x,x}$, with x=$(2n)^{1/2}$ and 2n=4, 16, 36, . . . , arrangement:

$A_{2,n}=2+n\geq 2(2n)^{1/2}=A_{x,x}$ $D_{2,n}=2n=D_{x,x}$ and $V_{2,n}=(2+n)/(2n)\geq(2/n)^{1/2}=(2(2n)^{1/2})/(2n)=V_{x,x}$ In contrast to $K_{x,x}$, the complete graph $K_{2,n}$ is planar; of course $V_{2,n}\geq V_{x,x}$ in square arrangement (x,x).

The arrangement in the preferred complete, bipartite $K_{2,n}$ structure of the preferred conductive surfaces disposed in one plane extends in general over the bottom side 12.2 of the substrate and the support 13 between the connection points 16.11.1 and 16.11.2 of an electronic component 16.12. The connection points 16.11.1 (x times) and 16.11.2 (n times) in FIG. 4b correspond as end nodes to the split nodes 17.1.x and 17.2.n in FIG. 4a, x=1, 2, n=1, . . . , 8. In V=A/D, A is then defined as the number of connection points 16.11. The component 16.12 is usually one microcontroller or it can be multiplexors or demultiplexors connected upstream of the latter.

The connection (edges) between the parts of the structure on the substrate 12 and the support 13 form the contact elements 16.10. The completeness of the $K_{2,n}$ arrangement can be shown as crossing-free, and optimally utilizes the connections of the microcontroller. A crossing-free structure can be advantageous not only on the substrate 12, but also on the support 13, particularly if the support should also have a one-layer conductor structure, for example, in the form of a single-layer electronic circuit board or in the form of a single-layer conductively loaded film support. Therefore, this is a preferred, cost-effective, representative form of the sensor arrangement.

Particularly advantageous is an arrangement in which the conductive structure between the contact points 16.7.1 and 16.7.2 on the substrate 12 already represent a complete, bipartite $K_{2,n}$ graph, as is indicated, for example, with the node networks 18.4 and 18.5, so that for each electrode 16.1.x and 16.2.n, precisely only one contact element 16.10 is necessary between the substrate 12 and the support 13. The split node network 18.3 does not illustrate this, for example, since here two contact elements are necessary. The combining of the two conductors in the network 18.3 into one connection point 16.11 is carried out first on the support 13. Due to the $K_{2,n}$ arrangement between the contact points 16.7.1 (x times) and 16.7.2 (n times), the number of contact elements 16.10 is reduced to its minimum possible number, which is equal to the node number 16.1.x and 16.2.n in the minor graph $K_{2,n}$, which once more is cost-effective. Then, in V=A/D defined here, A=either the number of contact points 16.7 or the number of contact elements 16.10.

If other types of electrodes are provided in the sensor arrangement, in addition to 16.1 and 16.2 (not shown in FIGS. 1, 4a, 4b), for example, grounding or screening surfaces, then the arrangement of conductive surfaces can be described as crossing-free, either with planar, bipartite graphs $K_{m,n}$, with m,n>2, or with planar, tripartite graphs $K_{1,m,n}$. Both graph structures, however, are no longer planar as complete graphs. As a complete $K_{3,n}$ arrangement, with n>2, for example, a third m-electrode type would be a screening surface, which would be disposed at a distance on each n-electrode, thus in the graph representation, would be joined via an edge (=screening edge) to each n-electrode. For $K_{3,n}$, with n>2, however, these are no longer planar as complete, bipartite graphs. In order to be able to represent the electrode arrangement in preferably one layer plane on the substrate, this would mean that the screening surface, for example, is to be shown discontinuous in the sensor layer 16 with more than one contact point 16.7, and its interconnection, which is not crossing-free, is shifted to support 13, which can be shown there in general as more cost-effective than on substrate 12. The support 13 is generally an electronic circuit board, on which conductor crossings can be shown simply. Or one needs to avoid an incomplete $K_{m,n}$, with m>2, n>2 arrangement, which then can be represented again overall as crossing-free, but also requires a larger number of contact elements 16.10 than the number of nodes 16.1.x and 16.2.n. Both measures can also be combined. In a $K_{l,m,n}$, l=1, m=2, n=N, tripartite arrangement, for example, a screening surface (1 node) would be arranged at a distance from each m-node (electrodes 16.1.1 and 16.1.2) and from each n-node (electrodes 16.2.n), i.e., connected to an edge in the graph representation. Here also, as in the case of the $K_{3,n}$ arrangement, it had to be used in order to assure a preferably planar representation on the substrate. Thus, if grounding or screening surfaces are present, according to one embodiment of the invention, it is generally provided that the arrangement of all conductive flat surface elements of the arrangement of sensors 16 i) between the connection points (16.11) of components (16.12) or
ii) between the contact points (16.7), and
iii) including the screening or grounding surfaces, are designed crossing-free, as a planar partite graph $K_{m,n}$ or $K_{l,m,n}$. These graphs can no longer be complete while maintaining planarity.

Figure 5:
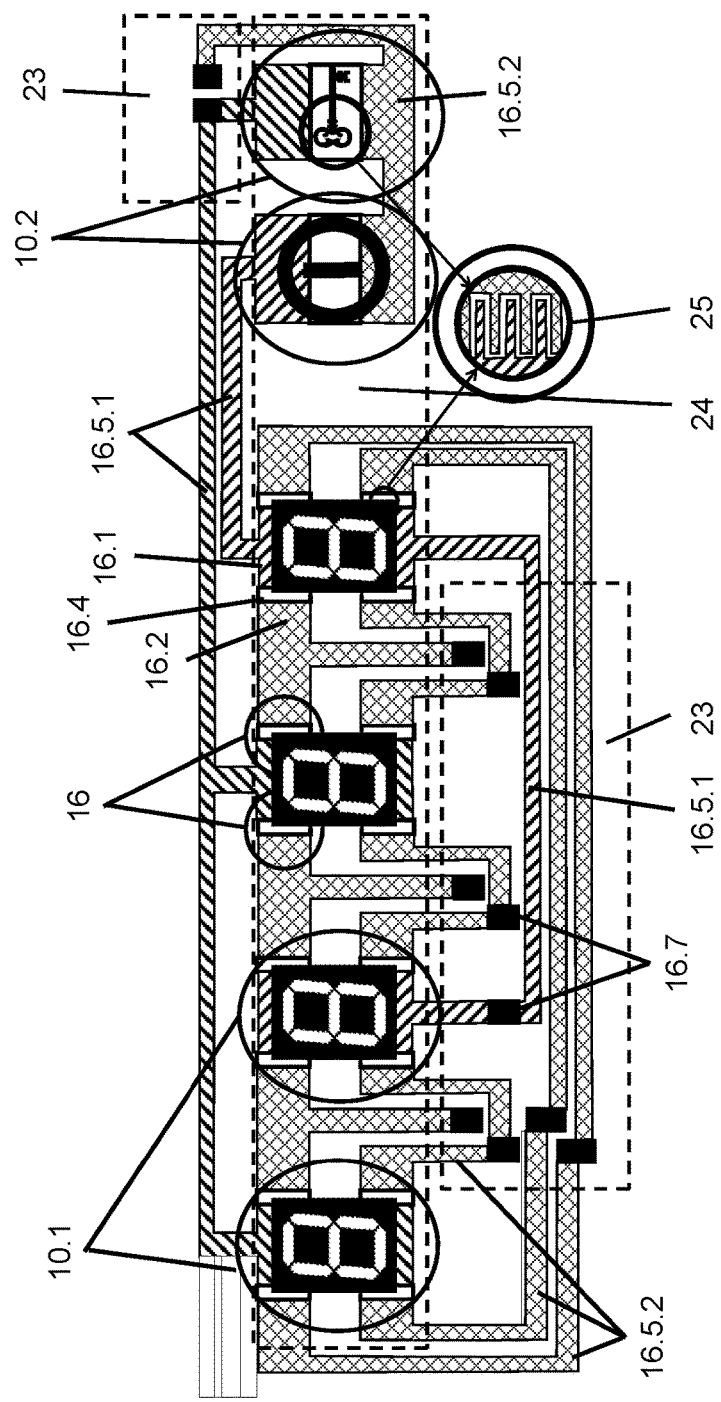
FIG. 5 shows an operating panel with several user interfaces.

FIG. 5 shows an operating panel 9, wherein a touch by the user's finger on the operator surface of the user interface can control the operation of the cooking apparatus. In general, without limitation to the particular exemplary embodiment shown, the operating panel comprises several user interfaces 10 with display elements 14, which can be operated separately by means of sensors, and indicate the operating state of the household appliance. Preferably, each display element 14 can be adjusted separately by means of the sensors assigned to it. Also, in the example shown in FIG. 1, several, namely two, user interfaces are already present.

The operating panel 9 of the example shown in FIG. 5 comprises i) four user interfaces 10.1 based on double-electrode sensors 16, each paired, with 2:N, N=4, structures, and ii) two paired user interfaces 10.2 based on double-electrode sensors 16 with 2:N, N=1, structures. The overall sensor structure of the operating panel is 2:N, N=9, and represents a planar, complete, bipartite graph $K_{2,9}$. The sensors 16 are configured with a gap 16.4, which has a meandering course 25 between the first electrode 16.1 and one of the second electrodes 16.2. The meandering course brings about an increase in the capacitance present between the electrodes 16.1, 16.2. Consequently, the signal-to-noise ratio of the sensor is improved with increasing constriction and length of the gap 16.4.

It can also be recognized here that the leads 16.5, 16.6 run without crossing. This has an advantageous effect i) on the electrical properties of the sensor (improvement of the signal-to-noise ratio), ii) on the complexity of the structure (smaller structural size of the device and less sensitivity to error), and iii) on the costs (less design, material, and repair costs).

The above-described pairwise interconnection of the first electrodes and the pairwise operation of the user interfaces 10.1, 10.2 considerably reduces the interconnection expenditure and makes possible the crossing-free running of the conductor tracks on the substrate 12. The exemplary embodiment of FIG. 5 in this case is based in summary on the fact that the electrodes 16.1, 16.2 of sensors 16 are disposed in a sensor matrix that is formed as a bipartite graph, wherein the bipartite graph for one user interface is a 1:N graph and for paired user interfaces 10.1, and 10.2 is a 2:N graph, and the second electrodes 16.2 form N second nodes of a second node set, and wherein the first electrodes 16.1 form two nodes of a first node set and the edges of the graph are formed by the gaps 16.4 between the first and second electrodes 16.1 or 16.2, respectively.

In order to be able to discriminate which of the user interfaces is acted on in the case of an interconnection of several first electrodes, such as, for example, a paired interconnection as shown in FIG. 5, it is additionally advantageous if the scanning of the sensors of the user interfaces is carried out successively one by one, or in time (division) multiplex. According to another embodiment of the invention, it is thus provided that the detection device for detecting sensor signals is set up so as to read out the sensors of different user interfaces with interconnected first electrodes intermittently over time.

Connection points 16.7 are disposed in the contact zone 23, which lies at the edge or outside an active operating region 24 of the user interfaces 10. In this way, that region of the substrate surface 12 that corresponds to the operator surface is viewed as the active operating region.

Double-electrode sensors are actuated and evaluated as pcap sensors by generating a signal on a first or second electrode, for example, via a digital output channel of the microcontroller, and the capacitively coupling-over signal on the second or first electrodes is evaluated, for example, via an analog input channel of the microcontroller. Advantageously, the two electrodes of the node set 16.1.x, with x=1, 2 (see FIG. 1) are connected to A/D converter inputs of the microcontroller, and the numerous electrodes of the node set 16.2.n are connected to digital outputs of the microcontroller, by means of which the sensor signal is emitted, and which are more cost-effective than the A/D inputs. This aspect becomes important with increasing number of sensors. In FIG. 10a, the two user interfaces of FIG. 1, with a 2:4 interconnection, have been doubled and are interconnected without crossing in a 2:8 matrix. Here, according to this interconnection with a microcontroller, two A/D input channels and eight digital output channels would be necessary.

On the other hand, it is advantageous for the signal-to-noise ratio, if the receiving electrode has a small surface. When acted on, a small sensor surface produces a better signal-to-noise ratio than a large sensor surface, since the capacitive coupling is greater for the acting finger in the ratio compared to the capacitive coupling of the sensor surface disposed further distant from the finger and facing the surroundings. In addition, it is advantageous, if the active, receiving electrode is surrounded by conductive surfaces at constant electrical potential, preferably at ground potential. This produces stable signal ratios. Grounded surfaces can also be conductive flat surface elements separate from the electrodes. This arrangement corresponds to tripartite graphs, as was already explained above. Alternatively, the flat surface elements of other sensors that are not utilized for querying a sensor can be connected to a constant electrical potential, preferably to ground potential of the control during this querying.

Figure 9:
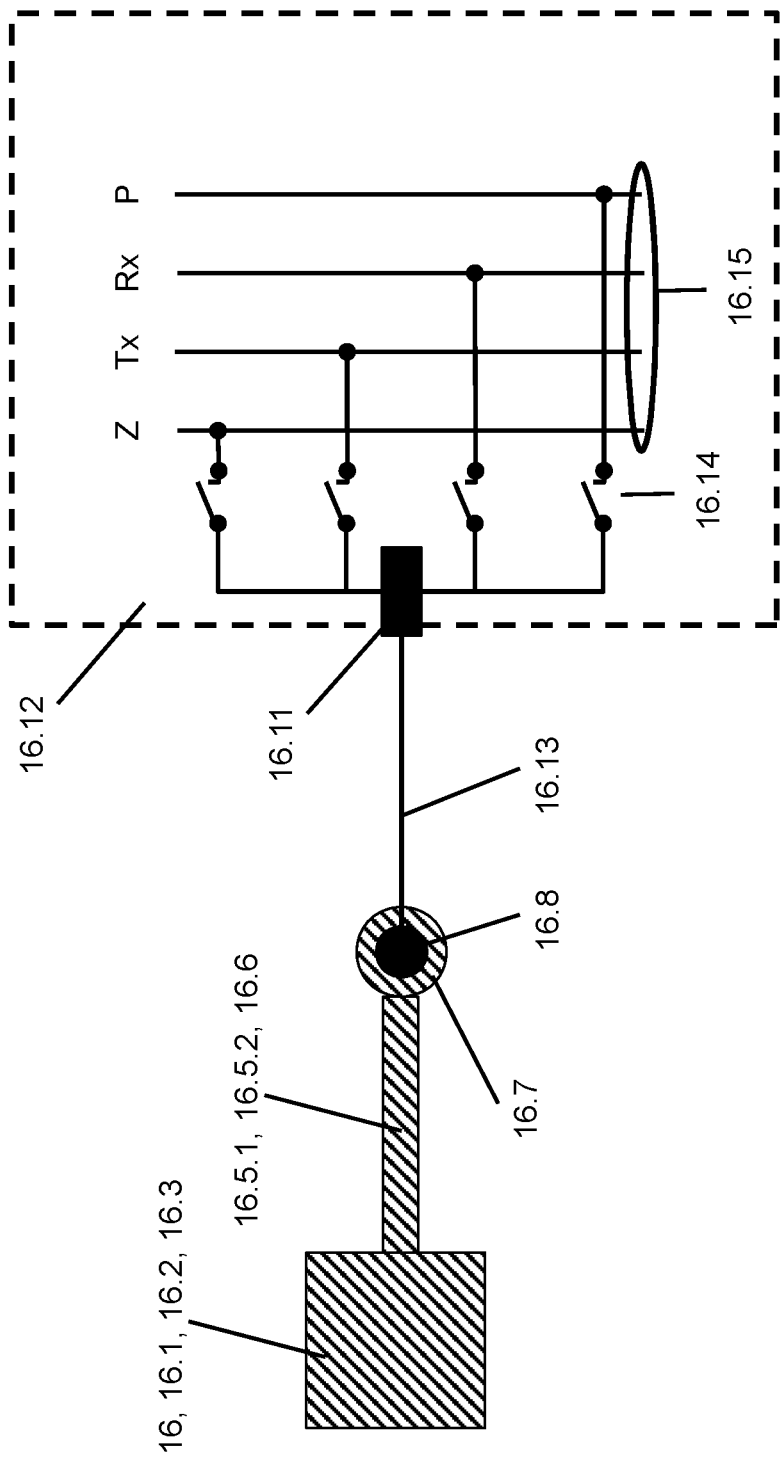
FIG. 9 shows a sensor electrode having controllable interconnection with signal buses.

In order to be able to cover the electrode surfaces flexibly with different signals, these surfaces preferably can be connected to different signal buses and configured as changeable, switchable intermittently by the control unit. FIG. 9 shows a sensor electrode 16, 16.1, 16.2, or 16.3, which is connected to a connection point 16.7 via a lead 16.5.1, 16.5.2 or 16.6. The connection point 16.7 is connected to the connection point 16.8 on the support via a contact element and is connected by means of a conductor track 16.13 to the connection point 16.11 of an electronic component 16.12. 16.12 can be a microcontroller as part of a control unit 22.1. In control unit 22.1, the sensor electrode 16 is connected via signal switch 16.14 to at most one of the signal buses 16.15. Connected with signal bus Z, the sensor electrode 16 represents a single-electrode sensor 16.3 for impedance measurement or a proximity sensor for the near field or far field, or a single-electrode sensor for the detection of a larger contamination, for example, containing water, which preferably surrounds the operating region as a conducting surface. Connected to the signal bus Tx, the electrode 16 represents a transmitting electrode 16.1 or 16.2 of a pcap sensor, or a shield electrode for adjacent single-electrode sensors, which are operated with the same sensor signal, in order to minimize the parasitic impedances of a single-electrode sensor. Connected to the signal bus Rx, the electrode 16 represents a receiving electrode 16.2 or 16.1 of a pcap sensor. Connected to the signal bus P, the electrode 16 represents a screening surface, for example, in the vicinity of a queried pcap sensor or a protective electrode, which preferably surrounds the operating region.

FIG. 10a shows four user interfaces with first electrodes 16.1.1 and 16.1.2 and second electrodes 16.2.n, n=8, which are connected in a 2:8 matrix and represent a planar, bipartite graph $K_{2,8}$. The electrodes 16.1.x are shaped as wide electrode bars above and below the operator region, so that they are also suitable for recognizing gestures in the far field.

FIG. 10b shows an interconnection of the arrangement of FIG. 10a. A first electrode 16.1.1 serves as a transmitting electrode 26.1, which is connected to a signal bus Tx; a second electrode 16.2.1 serves as receiving electrode 26.2, which is connected to a receiving bus Rx, having a small sensor surface in comparison to the total arrangement and compared to the surface size of a first electrode 16.1.x. The electrodes 26.1 and 26.2 with their sensor gap form sensor 16. Together with a screen electrode 26.3, the remaining electrodes 16.1.2 and 16.2.n are connected to a signal bus P set at a constant potential, and keep the surroundings of the receiving electrode 26.2 as much as possible at a constant potential that serves for screening electromagnetic interference signals. The total interconnection in FIG. 10c connects the original planar graph $K_{2,8}$ into a planar graph $K_{1,1,1}$.

In FIG. 10c, the electrodes 16.2.1-16.2.4 and 16.2.5-16.2.8 are each interconnected to a far-field electrode 26.4 with a large surface. Likewise, the electrodes 16.1.1 and 16.1.2 form a far-field electrode 26.4. The far-field electrodes 26.4 are connected to the signal bus Z and are intermittently queried in order to detect a far-field gesture in a two-dimensional lateral plane over the operating field.

FIG. 10d expands the sensor arrangement of FIG. 10a around an electrode 26.5 surrounding the operating field, which includes the active operating region 24, which, when connected to the signal bus P at ground potential can form a screen electrode, or when connected to the signal bus Z can form a protective electrode for recognizing large-surface contaminations or objects that are positioned erroneously, such as cooking pots. The total interconnection of FIG. 10d represents a planar, tripartite graph $K_{2,8,1}$.

FIG. 6a shows a schematic representation of an operating panel 9 with user interfaces 10 and a control 22.1 for the user interfaces 10. The sensors 16 and display elements 14 are electrically connected to the control 22.1. The control 22.1 detects and evaluates sensor signals. A signal of a sensor 16 of a sensor arrangement disposed on the edge has a time delay, when compared to a signal of another sensor 16 of the sensor arrangement preferably disposed on the edge. In response to the time delay, the control 22.1 is designed for the purpose of adjusting or changing a control value, preferably for the control of the display element 14 and for handing over control value signals to a power control 22.2 for control of the heating element.

FIG. 6b shows a cooking surface 8 comprising a support plate that is formed, for example, from glass or glass ceramic. Several cooking zones onto which cooking pots can be placed are formed on a top side of the support plate. The cooking surface 8 also comprises an operating panel 9, which is disposed in a cold region of the cooking surface 8. The operating panel 9 is that part of the cooking surface that serves for acting on to set different values such as power or cooking time.

In the examples shown in FIG. 6a and FIG. 6b, as also in the example according to FIG. 5, the display elements 14 and thus also the user interfaces 10 assigned to them are disposed in a row. One advantage of the invention, however, is that the position of the user interfaces is freely selectable. According to an enhancement of the invention, therefore, it is generally provided that the operating panel 9 has several user interfaces 10, wherein the envelope of the arrangement of user interfaces 10 forms any arbitrary polygon, in which the interconnected sensor electrodes are a part, preferably, of two, and more preferably precisely of one, planar, coherent matrix interconnection. In particular, the arrangement may not be square or rectangular. In an arrangement that is not square or rectangular, in the case of at least one of the display elements, the connection lines of its central point to the central points of the other display elements all stand at an angle other than 90° relative to one another.

The user interfaces 10 shown in FIGS. 1-3, 5 are simply structured and thus considerably more robust and cost-effective than known touch screens or multi-layer structured conductive layer constructions. They can be incorporated and integrated in a simple way in a modern household appliance or cooking apparatus by using for the substrate 12 a glass-ceramic plate or panel already present in the cooking apparatus.

The touch-sensitive region of the user interfaces 10 is found in the region of a display element 14, so that directly after the input of a control touch or gesture, the effect achieved is displayed by the display element 14. The user, on the one hand, can carry out a setting of power or time parameters by means of touch or gestures, so that his expectations will be met with the comfort of present-day technology. This includes an intuitive user interface due to proximity recognition in the near field and swiping gestures in the far field.

On the other hand, the display element 14 fulfills the expectations for the appearance and the uncomplicated operation of a household appliance, which should and shall have an appearance thoroughly different from a smart phone. The fulfillment of expectations, which appear contradictory at first glance, reinforce the user's trust in the appliance that he controls by means of the user interface that is present.

It is particularly advantageous that, compared with complex touch displays of conventional construction with swiping-gesture comfort, the user interfaces can be arbitrarily arranged and are not limited to a typical rectangular format of a touch display. In particular, the sensor arrangement for each appliance model can be disposed individually by means of corresponding coating or printing methods, just as is common, for example, with decorative printing of an appliance model. Due to the fact that the sensor components are no longer positioned on the support, as was previously common, the display elements can be positioned more flexibly due to the expanded free space, and can be positioned individually in a corresponding modular configuration also more simply for any appliance model.

REFERENCE NUMBERS

8 Cooking surface of a cooking apparatus
9 Operating panel
10 User interface
12 Substrate
12.1 Outer substrate surface, operator surface
12.2 Inner substrate surface
13 Support
13.1 Outer support surface
14 Display element
15 Luminous region of a display element 14
16 Sensor
16.1 An electrode from a first electrode set
16.1.x x=1,2, Electrodes from a first electrode set
16.2 An electrode from a second electrode set
16.2.N N=1, . . . , n Electrodes from a second electrode set
16.3 Single electrode
16.4 Gap
16.5.1 Electrode lead to 16.1.x electrodes
16.5.2 Electrode lead to 16.2.N electrodes
16.6 Electrode lead to 16.3 single electrode
16.7 Connection point of an electrode lead
16.7.1 Connection point of an electrode lead 16.5
16.7.2 Connection point of an electrode lead 16.6
16.8 Connection point on the support 13
16.9 Branching of electrode leads 16.5, 16.6
16.10 Contact element
16.11 Connection point of an electronic component
16.12 Electronic component
16.13 Conductor track on a support 13
16.14 Signal switch, controllable by a control device 22.1
16.15 Signal buses Z, Tx, Rx, P of a control unit 22.1
17.1 First node set of a bipartite graph
17.2 Second node set of a bipartite graph
17.3 Edges of a graph
18.1 Node of a splitting node
18.2 Edges of a splitting node
18.3 Splitting
18.4 Splitting
18.5 Splitting
19 External region
20 Direction of the swiping gesture of a user
21 Operating field as a film or glass touch screen
22.1 Control, control device of the operator interface 10
22.2 Power control
23 Contact zone
24 Active operating region
25 Meandering gap
26.1 Transmitting electrode
26.2 Receiving electrode
26.3 Screen electrodes at constant potential
26.4 Large-surface far-field electrodes
26.5 Surrounding protective or screen electrodes

What is claimed is:

1. An operating panel for a household appliance with at least one user interface, comprising:
    a planar support with an outer support surface facing an external region;
    a planar glass or glass-ceramic substrate with an outer substrate surface facing the external region and an opposite-lying inner substrate surface facing away from the external region and facing the outer support surface;
    a display element affixed to the planar support for luminous indication of information on the outer support surface; and
    a sensor arrangement having at least two sensors, each of the at least two sensors comprising at least one electrode, the at least two sensors being disposed directly on the inner substrate surface and being configured for interaction with a user located in the external region.

2. The operating panel according to claim 1, wherein the at least one electrode comprises a first electrode and a second electrode distanced laterally from the first electrode by a gap.

3. The operating panel according to claim 1, wherein the sensor arrangement comprises a first electrode common for all of the at least two sensors, and wherein the at least one electrode comprises a second electrode distanced laterally from the first electrode by a gap.

4. The operating panel according to claim 2, wherein the at least one user interface comprises two user interfaces and wherein at least two of the first electrodes of the two user interfaces are interconnected.

5. The operating panel according to claim 4, further comprising a detection device for detecting sensor signals, the detection device being configured to read out the at least two sensors of the two user interfaces intermittently over time.

6. The operating panel according to claim 4, further comprising a matrix interconnection with x first electrodes and n second electrodes, with x≥1, n≥2, and first and second electrodes are disposed at a distance to one another via non-conductive gaps, wherein the first and second electrodes are interconnected without crossing in precisely one electrically conductive layer plane, the conductive connections not passing through the non-conductive gaps.

7. An operating panel for a household appliance with at least one user interface, comprising:
    a planar support with an outer support surface facing an external region;
    a planar glass or glass-ceramic substrate with an outer substrate surface facing the external region and an opposite-lying inner substrate surface facing away from the external region and facing the outer support surface;

a display element affixed to the support for luminous indication of information on the outer support surface; and a sensor arrangement having at least two sensors, each of the at least two sensors comprising at least one electrode, the at least two sensors being disposed on the inner substrate surface and being configured for interaction with a user located in the external region, wherein the at least one electrode comprises a first electrode and a second electrode distanced laterally from the first electrode by a gap, wherein the at least one user interface comprises two user interfaces and wherein at least two of the first electrodes of the two user interfaces are interconnected, and wherein the electrodes of the sensors are disposed in a sensor matrix, which is formed as a bipartite graph, wherein the bipartite graph for one user interface is a 1:N or 2:N graph and for paired user interfaces (10) is a 2:N graph, and the second electrodes form N second nodes of a second node set, and wherein the first electrodes form 2 nodes of a first node set, and wherein the edges of the graph are formed by the gaps between the first and second electrodes.

8. The operating panel according to claim 7, wherein all conductive flat surface elements of the arrangement of sensors between the connection points of electronic components or between the contact points are crossing-free as a planar, bipartite graph $K_{m,n}$.

9. The operating panel according to claim 8, wherein all conductive flat surface elements of the arrangement of sensors between the connection points of components or between the contact points and including the shielding, screening, or potential surfaces, are crossing-free as a planar partite graph $K_{m,n}$ or $K_{1,m,n}$.

10. The operating panel according to claim 9, wherein the first and second electrodes and are actuated in alternating manner as a single-electrode open capacitor sensor, the other electrode set in each case being actuated as an interconnected screen electrode.

11. The operating panel according to claim 9, wherein the second electrodes are actuated as a single-electrode open capacitor sensor and the first electrodes are actuated z-times in alternating manner as a y-times interconnected shield electrode or y-times interconnected as a shield electrode and (x-y) interconnected as a screen electrode.

12. The operating panel according to claim 9, wherein the second electrodes are actuated as a single-electrode open capacitor sensor and the first electrodes are actuated as interconnected shield electrodes, and in alternating manner y-times interconnected electrodes are actuated z-times in an alternating manner as a proximity open capacitor sensor.

13. The operating panel according to claim 1, wherein at least one of the at least two sensors comprises a single electrode, the single electrode being disposed at an edge region of the display element or so as to overlap the display element in an overlapping region.

14. The operating panel according to claim 1, wherein at least one of the at least two sensors comprises a single electrode, the single electrode being at least partially transparent or has an opening so that the display element is visible through the electrode.

15. The operating panel according to claim 1, wherein at least one of the at least two sensors comprises a single electrode, the single electrode being a capacitive touch sensor.

16. The operating panel according to claim 1, wherein the electrodes are disposed in relation to the display element such that signals of spaced-apart sensors can be detected when an operator's finger or stylus passes over a luminous region of the display element.

17. The operating panel according to claim 1, further comprising a detection device for detecting and evaluating sensor signals, the detection device being configured to adjust or changing a control value in response to a time delay between sensors.

18. A method for producing an operating panel for a household appliance with at least one user interface, comprising:

producing a structured, electrically conductive coating on a planar, transparent glass or glass-ceramic plate or panel, wherein the coating forms electrodes for at least two sensors each comprising at least one electrode, the at least one electrode comprises a first electrode and a second electrode distanced laterally from the first electrode by a gap;

affixing at least one display element onto an outer support surface of a support, the outer support surface facing an external region; and fitting the support to the plate or panel on a side on which the electrodes are disposed, whereby contact elements of the support connect the electrodes to the support, wherein the electrodes are disposed and interconnected in a sensor matrix in such that the electrodes form nodes of a bipartite graph and the gaps between the first and second electrodes form edges of the bipartite graph.

19. The method according to claim 18, wherein the step of producing the structured, electrically conductive coating further comprises vapor depositing a transparent conductive coating by, the coating comprising a material selected from the group consisting of silver, copper, gold, transparent semiconductors, indium-gallium-zinc oxide, a transparent, conductive oxide layer, tin-doped indium oxide or $In_2O_3$:Sn, fluorine-doped tin oxide, $SnO_2$:F, antimony-doped tin oxide, $SnO_2$:Sb, aluminum-doped zinc oxide, ZnO:Al, and doped titanium oxide.

20. The method according to claim 18, wherein the step of producing the structured, electrically conductive coating further comprises printing an ink comprising an electrically conductive additive or an electrically conductive polymer and a solvent on the substrate and evaporating the solvent after applying the ink.

21. An operating panel for a household appliance with at least one user interface, comprising:

a planar support with an outer support surface facing an external region;

a display element affixed to the outer support surface of the planar support;

a planar glass or glass-ceramic substrate with an outer substrate surface facing the external region and an opposite-lying inner substrate surface facing away from the external region and facing the display element on the outer support surface; and a sensor arrangement having a plurality of single-electrodes disposed directly on the inner substrate surface respect to one another to detect a swiping gesture of a user located in the external region, wherein the plurality of single-electrodes are actuated, in an alternating manner, as either a single-electrode sensor or as a screen electrode so that spaces between a first set of the single-electrodes operated as single-electrode sensors are filled, at least partially, by a second set of the single-electrodes operated as screen electrodes.

22. The operating panel according to claim 21, wherein the first set of the single-electrodes are operated as near-field single-electrode sensors and the second set of the single-electrodes are operated as far-field single-electrode sensors.

* * * * *